US012761714B1

(12) United States Patent
Clearwater et al.

(10) Patent No.: US 12,761,714 B1
(45) Date of Patent: Oct. 13, 2026

(54) SYSTEMS AND METHODS FOR CLASSIFYING AN ELECTRIC POWER SOURCE POWERING A COMMUNICATION NODE AFTER AN APPARENT CONCLUSION OF A POWER OUTAGE

(71) Applicant: Cable Television Laboratories, Inc., Louisville, CO (US)

(72) Inventors: Scott H. Clearwater, Menlo Park, CA (US); Scott L. Caruso, Arvada, CO (US); Nicolas Joel Metts, Superior, CO (US); Stephen Arendt, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 87 days.

(21) Appl. No.: 18/592,230

(22) Filed: Feb. 29, 2024

Related U.S. Application Data

(60) Provisional application No. 63/538,418, filed on Sep. 14, 2023.

(51) Int. Cl.
*G06F 1/30* (2006.01)

(52) U.S. Cl.
CPC ...................................... *G06F 1/30* (2013.01)

(58) Field of Classification Search
CPC ......... G06F 1/30; G06F 1/3203; G06F 1/3206
See application file for complete search history.

(56) References Cited

U.S. PATENT DOCUMENTS

2012/0161752 A1* 6/2012 Spooner ............. G01R 19/2513 324/142
2015/0261241 A1* 9/2015 McKeag ................ G05B 15/02 700/295
2017/0264097 A1* 9/2017 Pancheri ................ G01R 11/04
2020/0021134 A1* 1/2020 Caruso ................... G06Q 50/06

* cited by examiner

*Primary Examiner* — Jaweed A Abbaszadeh
*Assistant Examiner* — Gayathri Sampath
(74) *Attorney, Agent, or Firm* — PdZ Patent Law, PLLC

(57) ABSTRACT

A method for classifying an alternating current (AC) electric power source powering a first node of a communication network after an apparent conclusion of a power outage. The method includes (1) receiving, at a classification system, measurement data from a sensor that is transmitted to the classification system via the communication network, and (2) comparing, at the classification system, (i) a portion of the measurement data generated by the sensor before a power outage of an AC electric power grid at a location of the sensor and (ii) a portion of the measurement data generated by the sensor after an apparent conclusion of the power outage of the AC electric power grid at the location of the sensor, to determine whether first node is being powered by a generator or by the AC electric power grid, after the apparent conclusion of the power outage.

14 Claims, 12 Drawing Sheets

SYSTEMS AND METHODS FOR CLASSIFYING AN ELECTRIC POWER SOURCE POWERING A COMMUNICATION NODE AFTER AN APPARENT CONCLUSION OF A POWER OUTAGE

CROSS REFERENCE TO RELATED APPLICATIONS

This application claims the benefit of U.S. Provisional Patent Application No. 63/538,418, filed on Sep. 14, 2023, which is incorporated herein by reference.

BACKGROUND

An electric power grid may experience a power outage whereby the electric power grid is unable to provide electric power to one or more loads powered by the electric power grid. A power outage may be caused, for example, by severe weather, equipment failure, equipment damage, or extreme load conditions. A power outage may be mitigated by use of a generator to provide electric power to one or more loads in place of electric power from the electric power grid.

For example, communication networks frequently include backup generators for powering communication network infrastructure during a power outage. A power outage or other electric power grid event, such as abnormal electric power grid voltage or abnormal electric power grid frequency, can be detected by one or more sensors that generate measurement data representing one or more parameters of the electric power grid, such as measurement data representing electric power grid voltage, current, and/or frequency.

DETAILED DESCRIPTION OF THE EMBODIMENTS

Figure 1:
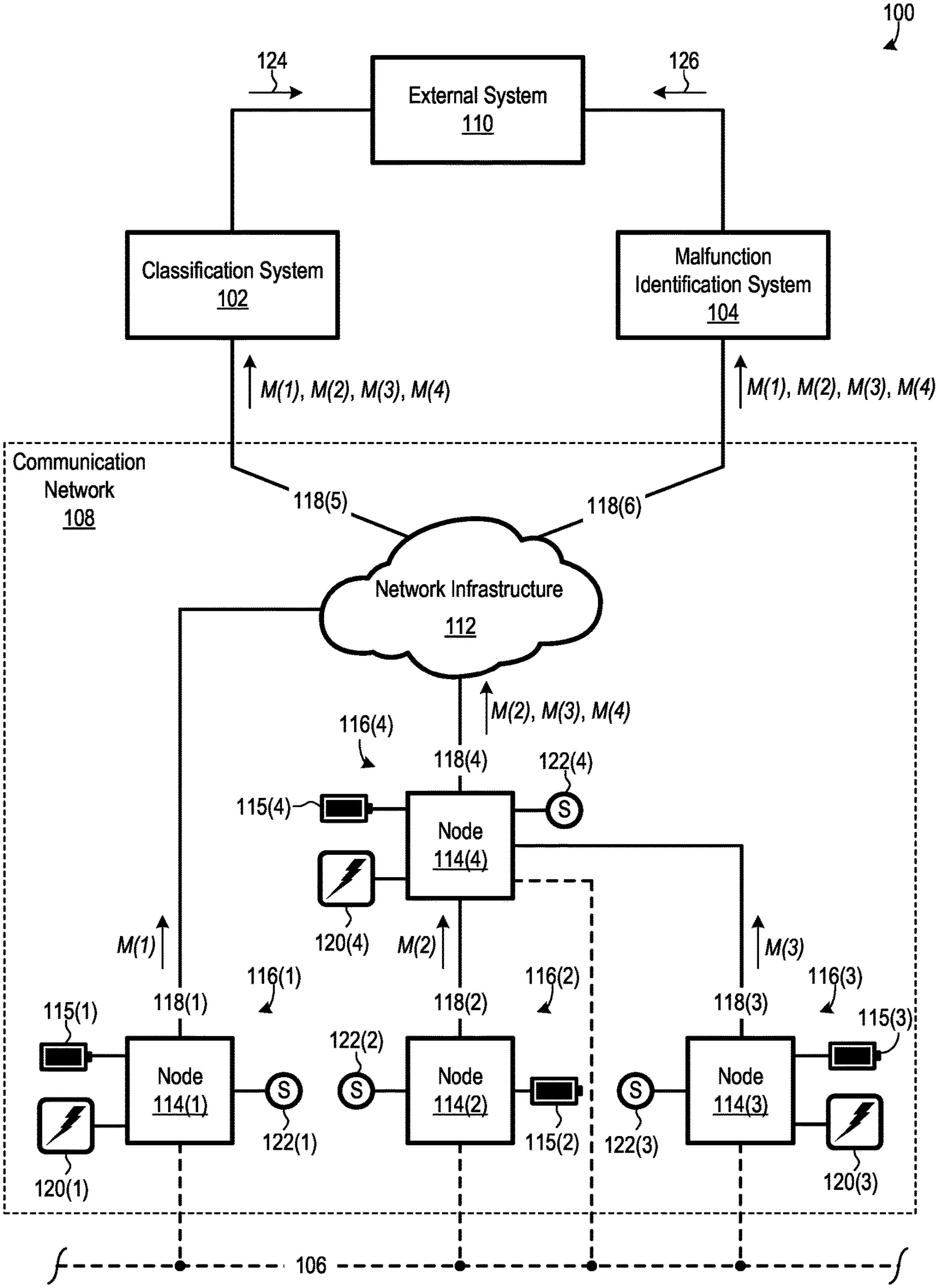
FIG. 1 is a schematic diagram of an electrical and communication environment including a classification system and a malfunction identification system, according to an embodiment.

It is desirable to automatically detect an electric power grid event, such as a power outage, an abnormal voltage, or an abnormal frequency, as many parties have an interest in being notified of an electric power grid event. For example, electric utilities want to be notified of power outages and other electric power grid events so that they can quickly address these issues. Additionally, electric utilities are interested in historical electric power grid events so that they can investigate these events and take steps to prevent their reoccurrence. Furthermore, public safety agencies have great interest in timely notification of power outages, as well as timely notification of power restoration, so that the agencies can quickly and accurately deploy resources to areas experiencing a power outage. Moreover, insurance companies have an interest in historical electric power grid events, such as when adjusting claims associated with past power outages.

As mentioned above, sensors can be used to detect an electric power grid event, such as by sensing power grid voltage and/or current at respective locations on the electric power grid. However, a system that relies on sensors for detecting an electric power grid event may be spoofed by a generator providing electric power in place of the electric power grid. For example, assume that a system for detecting an electric power grid event includes a sensor at a node of a communication network, where the sensor detects alternating current (AC) power supply voltage provided to the node. The sensor may detect a power outage at the location of the sensor in response to magnitude of voltage measured by the sensor dropping to zero, or to near zero. However, assume that an operator of the communication network has deployed a backup generator at the node site. The generator may provide AC electric power to the node in place of electric power from the electric power grid, such that the sensor may detect normal voltage magnitude in response to generator operation, even though the electric power grid is experiencing an outage. Consequently, the system for detecting an electric power grid event may infer from the normal voltage magnitude detected by the sensor that the power outage is over, while in reality, the power outage is continuing and the node is being powered by the backup generator.

Additionally, a sensor may partially or completely fail and thereby provide erroneous measurement data, which may cause a system for detecting an electric power grid event to erroneously detect, or fail to detect, an electric power grid event. For example, assume that a sensor measuring voltage of an electric power grid erroneously generates measurement data indicating that the magnitude of the voltage has to dropped to zero when actual voltage magnitude is within a normal range. Such erroneous measurement data from the sensor may cause the system for detecting the electric power grid event to erroneously determine that there is a power outage at a location of the sensor.

Disclosed herein are new systems and methods which may at least partially overcome one or more of the problems discussed above. For example, disclosed herein are systems for classifying an AC electric power source powering a node of a communication network after an apparent conclusion of a power outage, which are capable of determining whether the node is being powered by an AC electric power grid, or a generator, after the apparent conclusion of the power outage. For instance, particular embodiments include a classification system configured to receive measurement data from one or more sensors, where the measurement data from each sensor represents one or more characteristics of AC electric power provided to a respective node, such as AC voltage, AC current, and/or AC frequency, provided to the node. The measurement data is transmitted to the classification system, for example, by one or more communication networks that are separate from the AC electric power grid, such that the measurement data is transmitted from the sensors to the classification system out-of-band with respect to the AC electric power grid. In some embodiments, each sensor is incorporated with a respective node of a communication network.

Particular embodiments of the classification system are configured to classify an AC electric power source powering a node of a communication network after an apparent conclusion of a power outage at least partially by determining a difference value representing a difference between (i) measurement data generated by a sensor before a power outage and (ii) measurement data generated by the sensor after the apparent conclusion of the power outage. These embodiments may then classify the AC electric power source providing AC electric power to the node based on the difference value. For example, some embodiments of the classifications system may (i) classify the AC electric power source as being an AC electric power grid in response to the difference value not meeting one or more threshold conditions, and (ii) classify the AC electric power source as being a generator in response to the difference value meeting the one or more threshold conditions. The one or more threshold conditions are, for example, minimum difference values for classifying an AC electric power source as a generator and not an AC electric power grid. The classification system may determine a difference value, for example, by comparing a range of measurement data values generated before the power outage to a single measurement data value generated after the apparent conclusion of the power outage. Alternately or additionally, the classification system may determine a difference value by performing statistical analysis on measured data obtained at multiple times before the power outage and on measured data obtained at multiple times after the apparent conclusion of the power outage. Some embodiments of the classification system are configured to send a signal identifying classification of an AC electric power source to an external system, such as to inform the external system whether a node of a communication network is being powered by an AC electric power grid or by a generator, after an apparent conclusion of a power outage.

Furthermore, some embodiments of the classification system are configured to determine multiple difference values using different respective statistical analysis techniques and classify an AC electric power source based on the multiple difference values, such as based on a consensus of the multiple difference values. Two or more of the multiple difference values may be determined from sensor measurement data generated during different respective time periods, such as to help increase confidence in the classification of the AC electric power source.

Moreover, disclosed herein are systems and methods for identifying a malfunctioning sensor. For example, in particular embodiments, a malfunction identification system is configured to receive measurement data from one or more sensors, where the measurement data from each sensor represents one or more characteristics of an electric power grid at the sensor's respective location, such as electric power grid voltage, current, and/or frequency at the sensor's respective location. The measurement data is transmitted to the malfunction identification system, for example, by one or more communication networks that are separate from the electric power grid, such that the measurement data is transmitted from the sensors to the malfunction identification system out-of-band with respect to the electric power grid. In some embodiments, each sensor is incorporated with a respective communication node of a communication network.

Certain embodiments of the malfunction identification system are configured to determine an event rate of a first sensor based at least partially on received measurement data from the first sensor. These embodiments of the malfunction identification system are further configured to identify the first sensor as a malfunctioning sensor, for example, at least partially in response to (i) the event rate of the first sensor meeting a first threshold condition and (ii) a collective event rate of the one or more additional sensors not meeting a second threshold condition. The first and second threshold conditions may be the same or they may be different, and each event rate is, for example, a power outage rate. The additional sensors are, for example, located within a predetermined proximity to the first sensor. For instance, the additional sensors may located in the same map cell as the first sensor, or the additional sensors may be located in one or more map cells that are immediately adjacent to a map cell including the first sensor. The malfunction identification system is further configured, for example, to send a signal indicating that the first sensor is a malfunctioning sensor to an external system, such as to cause the external system to disregard data received from the first sensor when automatically detecting an electric power grid event.

FIG. 1 is a schematic diagram of an electrical and communication environment 100, henceforth "environment 100" for brevity, including a classification system 102 and a malfunction identification system 104, where classification system 102 is one embodiment of the new classification systems disclosed herein and malfunction identification system 104 is one embodiment of the new malfunction identification systems disclosed herein. Environment 100 further includes an AC electric power grid 106, a communication network 108, and an external system 110. AC electric power grid 106 is configured to provide AC electric power to loads served by AC electric power grid 106. While only a small portion of AC electric power grid 106 is shown in FIG. 1, it is understood that AC electric power grid 106 may include additional elements, such as additional distribution lines, transmission lines, power plants and/or other electric power generation sources, transformers, switch gear, circuits breakers, fuses, reclosers, etc. Additionally, while AC electric power grid 106 is depicted in single line style for illustrative clarity, it is understood that AC electric power grid 106 may include multiple conductors, such as a line conductor and a ground inductor, three line conductors and a ground conductor for supporting three phase electric power, etc. Additionally, in embodiments of environment

100 where classification system 102 (discussed below) is omitted, AC electric power grid 106 may be replaced with a direct current (DC) electric power grid. While communication network 108 is at least partially powered by AC electric power grid 106, communication network 108 is separate from AC electric power grid 106. Indeed, in particular embodiments, communication network 108 can at least partially function during an outage of AC electric power grid 106, as discussed below.

Communication network 108 is configured to provide communication services, such as by transferring data between communication nodes. Communication network 108 is, for example, a wireline communication network (e.g., a cable wireline communication network, such as operating according to a Data Over Cable Service Interface Specification [DOCSIS] standard, an optical wireline communication network [e.g., operating according to a passive optical network standard or a coherent optical network standard], or a digital subscriber line [DSL] wireline communication network), a wireless communication network (e.g., a Wi-Fi wireless communication network [e.g., operating according to an Institute of Electrical and Electronics Engineers (IEEE) 802.-11 based standard], a cellular wireless communication network [e.g., operating according to a Third Generation Partnership Project (3GPPP) standard, such as a Long Term Evolution (LTE) standard, a Fifth Generation (5G) standard, a Sixth Generation (6G) standard, or successors thereof], a satellite wireless communication network [e.g., using very low earth orbit (VLEO) satellites, low earth orbit (LEO) satellites, medium earth orbit (MEO) satellites, or geostationary equatorial orbit (GEO) satellite satellites], a long range [LoRa] wireless communication network, a Zigbee wireless communication network, or a Z-Wave wireless communication network), a hybrid wireline and wireless communication network, or a converged wireline and wireless communication network. Communication network 108 includes network infrastructure 112 and a plurality of nodes 114. In this document, specific instances of an item may be referred to by use of a numeral in parentheses (e.g. node 114(1)) while numerals without parentheses refer to any such item (e.g. nodes 114). While communication network 108 is depicted as including four nodes 114, the number of nodes 114 of communication network 108 may vary. For example, communication network 108 could include thousands of nodes 114, or communication network 108 could be limited to a single node 114.

Each node 114(1), 114(2), and 114(3) is configured to provide communication services at its respective location 116(1), 116(2), and 116(3), such as communication services to subscribers (not shown) at its respective location 116(1), 116(2), and 116(3). Example of nodes 114 include, but are not limited to, fiber nodes (i.e., nodes configured to convert between an optical domain and an electrical domain), remote terminals, digital subscriber line access multiplexors (DSLAMs), wireless base stations (e.g., Wi-Fi wireless base stations or cellular wireless base stations), satellite wireless ground stations, optical line terminals (OLTs), optical network terminals (ONTs), modem termination systems, modems (e.g., wireline modems or wireless modems), etc. Node 114(4), in contrast, need not be capable of providing communication service at its location 116(4), but node 114(4) supports nodes 114(2) and 114(3). Examples of node 114(4) include, but are not limited to, a repeater, an amplifier, a multiplexor-demultiplexor, a central unit of a wireless base station, etc. Each node 114 need not have the same configuration.

Network infrastructure 112 includes all elements of communication network 108 other than nodes 114. Although network infrastructure 112 is symbolically shown as a single element, network infrastructure 112 can, and typically, will include multiple elements that are not necessarily co-located. Examples of network infrastructure 112 include, but are not limited to, one or more of optical communication links, electrical communication links, wireless communication links, splitters, concentrators, amplifiers, repeaters, modem termination systems, wireless communication core networks, hubs, optical line terminals, routers, switches, servers, etc. In some embodiments, network infrastructure 112 includes cable network infrastructure, wireline telecommunications infrastructure, and/or wireless telecommunications infrastructure. FIG. 1 depicts communication network 108 forming a plurality of communication links 118 between elements of communication network 108, such as nodes 114, and elements external to communication network 108, such as classification system 102 and malfunction identification system 104. In certain embodiments, one or more of the plurality of communication links 118 are logical communication links instead of physical communication links.

Each node 114 is powered by AC electric power grid 106. Additionally, a respective backup battery power source 115, such as a battery electrically coupled to an inverter, is associated with each node 114 to electrically power the node 114 in case AC electric power grid 106 experiences a power outage at the respective location 116 of the node 114. While FIG. 1 depicts backup battery power sources 115 being external to nodes 114, backup battery power sources 115 could be internal to nodes 114. Additionally, generators 120(1), 120(3), and 120(4) are deployed at locations 116(1), 116(3), and 116(4), respectively. Each generator 120 is, for example, a diesel fuel generator, a natural gas generator, a propane generator, a gasoline generator, a fuel cell, a wind turbine, a hydroelectric turbine, one or more photovoltaic devices electrically coupled to an inverter, etc. Generator 120(1) is capable of electrically powering node 114(1), such as in the event of a power outage on AC electric power grid 106 at location 116(1) and after depletion of backup battery power source 115(1). Similarly, generator 120(3) is capable of electrically powering node 114(3), such as in the event of a power outage on AC electric power grid 106 at location 116(3) and after depletion of backup battery power source 115(3). Additionally, generator 120(4) is capable of electrically powering node 114(4), such as in the event of a power outage on AC electric power grid 106 at location 116(4) and after depletion of backup battery power source 115(4). There is no generator deployed at location 116(2), and node 114(2) therefore is not capable of operating in the event of a power outage on AC electric power grid 106 after depletion of backup battery power source 115(2). While not shown, network infrastructure 112 may include one or more backup batteries and/or generators to power network infrastructure 112 in the event of a power outage on AC electric power grid 106.

A respective sensor 122 is incorporated with each node 114. Sensors 122 may be within nodes 114, or sensors 122 may be external to nodes 114 while being associated with nodes 114. Each sensor 122 is configured to generate respective measurement data M representing one or more characteristics of AC electric power provided to its respective node 114. In particular, sensor 122(1) is configured to generate measurement data M(1) representing one or more characteristics of AC electric power provided to node 114(1), sensor 122(2) is configured to generate measurement data M(2) representing one or more characteristics of AC electric power provided to node 114(2), and so on. It should be noted that measurement data M for a given node 114 at a given time will reflect one or more characteristics of whatever AC electric power source, e.g., AC electric power grid 106 or a generator 120, that is providing electric power to the node 114 at the time. For example, measurement data M(1) will reflect one or more characteristics of AC electric power provided to node 114(1) by AC electric power grid 106 at times when node 114(1) is being powered by AC electric power grid 106. As another example, measurement data M(1) will reflect one or more characteristics of AC electric power provided to node 114(1) by generator 120(1) at times when node 114(1) is being powered by generator 120(1). Examples of characteristics of AC electric power provided to a node 114 include, but are not limited, one or more of root mean square (RMS) magnitude of AC voltage and/or current provided to the node 114, peak-to-peak magnitude of AC voltage and/or current provided to the node 114, instantaneous magnitude of AC voltage and/or current provided to the node 114, frequency of AC voltage and/or current provided to the node 114, noise content of AC voltage and/or current provided to the node 114, and harmonic content of AC voltage and/or current provided to the node 114. Some embodiments of sensors 122 generate measurement data M at a relatively slow rate, such as once per minute, once per five minutes, once per ten minutes, etc. Other embodiments of sensors 122 generate measurement data M at a relatively fast rate, such as 1,000 samples per second, 10,000 samples per second, etc. Some embodiments of sensors 122 are configured to generate measurement data Mrepresenting one or more parameters at locations 116 of nodes 114 in addition to electric power parameters, such as temperature, humidity, visible ambient light intensity, infrared ambient light intensity, ultraviolet ambient light intensity, intensity and/or frequency of radio frequency signals, electromagnetic pulse intensity, air quality, presence of smoke, presence of radiation, presence of motion, etc.

Figure 2:
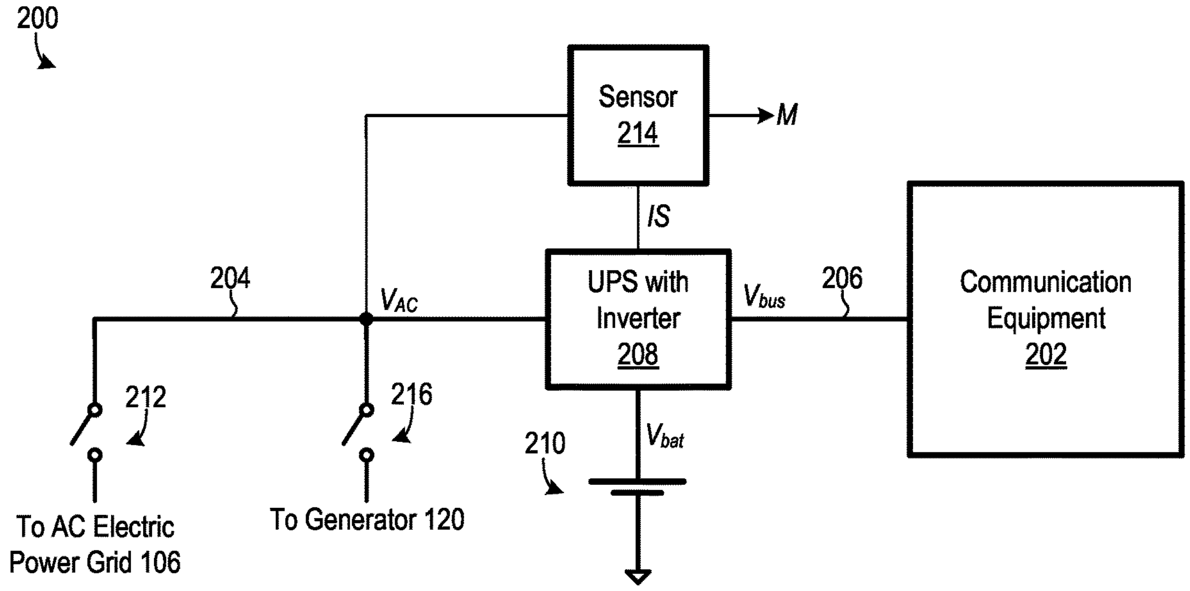
FIG. 2 is a schematic diagram of one embodiment of a node of the FIG. 1 electrical and communication environment where a generator is deployed at a location of the node.
Figure 3:
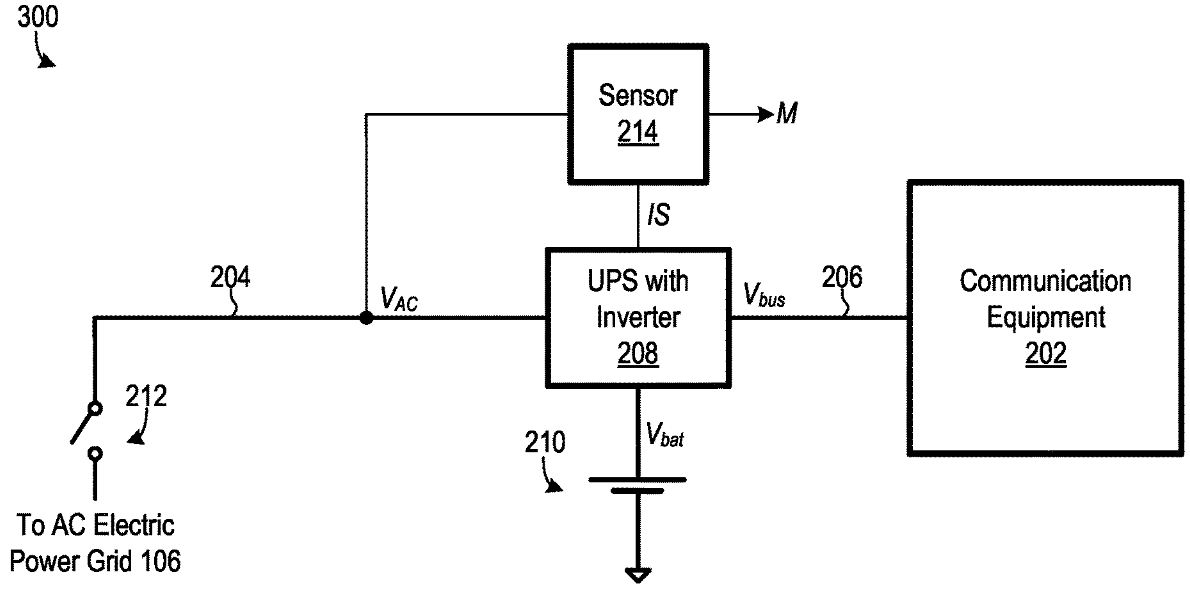
FIG. 3 is a schematic diagram of one embodiment of a node of the FIG. 1 electrical and communication environment where no generator is deployed at a location of the node.

FIGS. 2 and 3 respectively illustrate example embodiments of nodes 114. It is understood, though, that nodes 114 are not limited to the embodiments of FIGS. 2 and 3.

FIG. 2 is a schematic diagram of a node 200, which is one embodiment of a node 114 where a generator 120 is deployed at a location 116 of the node 114. For example, one or more of nodes 114(1), 114(3), and 114(4) may be embodied according to node 200 of FIG. 2. Node 200 includes communication equipment 202, a first power bus 204, a second power bus 206, an uninterruptible power supply (UPS) 208, a backup battery 210, a first switch 212, a sensor 214, and a second switch 216. Communication equipment 202 is configured to perform communication functions of node 200, and the configuration of communication equipment 202 will vary according to the application of node 200. For example, in embodiments where communication equipment 202 is part of one or more wireline communication links, communication equipment 202 includes wireline communication equipment (not shown). As another example, in embodiments where communication equipment 202 is part of one or more wireless communication links, communication equipment 202 includes wireless communication equipment (not shown). Communication equipment 202 receives AC electric power having an AC voltage $V_{bus}$ from second power bus 206, such that communication equipment 202 is powered from second power bus 206. While not required, it is anticipated that communication equipment 202 will include one or more power supplies (not shown) to convert voltage $V_{bus}$ on second power bus 206 to one or more AC and/or DC power supply voltages required by communication equipment 202.

First power bus 204 receives input AC electric power to node 200 for powering node 200, and first power bus 204 has an AC voltage $V_{AC}$. UPS 208 and backup battery 210 collectively form an embodiment of a backup battery power source 115 of FIG. 1. UPS 208 interfaces first power bus 204 with second power bus 206, and UPS 208 operates as follows. When voltage $V_{AC}$ on first power bus 204 is within a predetermined acceptable range for powering node 200, UPS 208 connects second power bus 206 to first power bus 204, such that communication equipment 202 is powered from first power bus 204 via UPS 208 and second power bus 206. UPS 208 may also charge backup battery 210 with energy from first power bus 204 when voltage $V_{AC}$ on first power bus 204 is within the predetermined acceptable range for powering node 200. On the flip side, when voltage $V_{AC}$ is outside of the predetermined acceptable range for powering node 200, such as due to a power outage on AC electric power grid 106, an under-voltage condition on AC electric power grid 106, or an over-voltage condition on AC electric power grid 106, UPS 208 (i) disconnects second power bus 206 from first power bus 204 and (ii) activates an inverter within UPS 208 which converts a DC voltage $V_{bat}$ across backup battery 210 to AC voltage $V_{bus}$ on second power bus 206, such that backup battery 210 powers communication equipment 202 via UPS 208 and second power bus 206.

Each of first switch 212 and second switch 216 is configured to selectively electrically couple a respective AC electric power source to first power bus 204. Specifically, first switch 212 is configured to selectively electrically coupled AC electric power grid 106 to first power bus 204, and second switch 216 is configured to selectively electrically couple a generator 120 to first power bus 204. In some embodiments, communication equipment 202 generates control signals to control first switch 212 and second switch 216, while in some other embodiments, these control signals are generated by another element (not shown) internal to, or external to, node 200. When node 200 is being powered by AC electric power grid 106, first switch 212 is closed and second switch 216 is open, and when node 200 is being powered from a generator 120, first switch 212 is open and second switch 216 is closed.

Node 200 could be powered by either backup battery 210 or by a generator 120 in the event of a power outage on AC electric power grid 106. However, a generator 120 may take time to start and ramp up to a suitable speed for powering node 200, while UPS 208 may respond almost instantaneously to an activation command. Additionally, it may be undesirable to start a generator 120 for powering node 200 for only a short amount of time, e.g., during a short-term power outage. Moreover, generator 120 may need to be manually started after a power outage. Therefore, while not required, it is anticipated that node 200 will typically be initially powered by backup battery 210 via UPS 208 in the event of a power outage on AC electric power grid 106, and a generator 120 will be used to power node 200 only during a prolonged power outage on AC electric power grid 106, such as if battery 210 is expected to be depleted to a point that it can no longer adequately power node 200 during the power outage.

Sensor 214, which is an embodiment of a sensor 122 of FIG. 1, is configured to generate measurement data M representing each of (i) voltage $V_{AC}$, such as RMS magnitude of voltage $V_{AC}$, peak-to-peak magnitude of voltage $V_{AC}$, instantaneous magnitude of voltage $V_{AC}$, frequency of voltage $V_{AC}$, and/or harmonic content of voltage $V_{AC}$, and (ii) inverter status IS. Inverter status IS indicates status of UPS 208. For example, inverter status IS may indicate whether the inverter of UPS 208 is operating, and if so, whether node 200 is being powered from backup battery 210, whether backup battery 210 is being charged, whether backup battery 210 is undergoing testing, etc.

FIG. 3 is a schematic diagram of a node 300, which is one embodiment of a node 114 where no generator is deployed at a location 116 of the node 114. For example, node 114(2) may be embodied according to node 300 of FIG. 3. Node 300 is like node 200 of FIG. 2 except that second switch 216 is omitted from node 300. As such, node 300 may be powered from either AC electric power grid 106 or backup battery 210, but node 300 is not capable of being powered from a generator.

Referring again to FIG. 1, communication network 108 is configured to transmit measurement data M from sensors 122 to each of classification system 102 and malfunction identification system 104. For example, communication network 108 is configured to transmit measurement data M(1) generated by sensor 122(1) to classification system 102 via communication links 118(1) and 118(5), and communication network 108 is configured to transmit measurement data M(1) generated by sensor 122(1) to malfunction identification system 104 via communication links 118(1) and 118(6). As another example, communication network 108 is configured to transmit measurement data M(2) generated by sensor 122(2) to classification system 102 via communication links 118(2), 118(4), and 118(5), and communication network 108 is configured to transmit measurement data M(2) generated by sensor 122(2) to malfunction identification system 104 via communication links 118(2), 118(4), and 118(6). As a further example, communication network 108 is configured to transmit measurement data M(3) generated by sensor 122(3) to classification system 102 via communication links 118(3), 118(4), and 118(5), and communication network 108 is configured to transmit measurement data M(3) generated by sensor 122(3) to malfunction identification system 104 via communication links 118(3), 118(4), and 118(6). Communication network 108 is optionally further configured to transmit measurement data M to one or more additional systems (not shown).

It should be noted that communication network 108 transmits measurement data M out-of-band with respect to AC electric power grid 106. For example, communication network 108 transmits measurement data M to each of classification system 102 and malfunction identification system 104 along communication paths that are separate from AC electric power grid 106. As another example, communication network 108 is capable of transmitting measurement data M to each of classification system 102 and malfunction identification system 104 during a partial or full power outage of AC electric power grid 106, assuming nodes 114 and network infrastructure 112 are powered by backup batteries and/or generators. Accordingly, in particular embodiments, measurement data M may be generated by sensors 122 and transmitted to classification system 102 and malfunction identification system 104 even if AC electric power grid 106 is partially or fully impaired.

Classification system 102 and malfunction identification system 104 each use measurement data M from sensors 122 transmitted thereto by communication network 108, as discussed further below. While classification system 102 and malfunction identification system 104 are illustrated as being separate elements, they may be partially or fully combined, and one or both of these systems may be partially or fully combined with another system. For example, classification system 102 and malfunction identification system 104 could be part of a common system (not shown) for automatically detecting an electric power grid event. External system 110 is any system that receives a classification signal 124 from classification system 102 and/or a malfunction identification signal 126 from malfunction identification system 104. As discussed below, classification signal 124 indicates whether a node 114 is being powered by AC electric power grid 106 or a generator 120 after an apparent conclusion of a power outage, and malfunction identification signal 126 indicates that a sensor 122 is a malfunctioning sensor. In some embodiments, classification system 102 and/or malfunction identification system 104 are partially or fully combined with external system 110, such that classification signal 124 and/or malfunction identification signal 126 do not necessarily leave a single system.

Classification System 102

While measurement data M represents one or more characteristics of AC electric power provided to respective nodes 114, measurement data M does not directly indicate whether a given node 114 is being powered by AC electric grid 106 or by a generator 120 after an outage of AC electric power grid 106. For example, refer again to node 200 of FIG. 2. Measurement data M generated by sensor 214 includes inverter status IS, and measurement data M generated by sensor 214 therefore indicates whether node 200 is being powered from backup battery 210 via UPS 208. However, in cases where node 200 is being powered by an AC electric power source connected to first power bus 204, measurement data M does not directly indicate whether the AC electric power source is AC electric power grid 106 or a generator 120, as voltage $V_{bus}$ could be generated by either of these two AC electric power sources. Applicant has determined, however, that AC electric power provided to node 200 will typically differ according to whether node 200 is being powered by AC electric power grid 106 or by a generator 120. For example, RMS magnitude of voltage $V_{AC}$, peak-to-peak magnitude of voltage $V_{AC}$, frequency of voltage $V_{AC}$, noise content of voltage $V_{AC}$, and/or harmonic content of voltage $V_{AC}$, will typically differ according to whether node 200 is being powered by AC electric power grid 106 or by a generator 120. Accordingly, it can be determined whether AC electric power grid 106 or a generator 120 is powering node 200 after an apparent conclusion of a power outage by comparing $V_{AC}$ before the power outage to $V_{AC}$ after the apparent conclusion of the power outage, where the apparent conclusion of the power outage is characterized by voltage $V_{AC}$ on first power bus 204 returning to being within an acceptable range after being outside of the acceptable range. A significant difference between $V_{AC}$ before the power outage and $V_{AC}$ after the apparent conclusion of the power outage, e.g., a difference meeting a predetermined threshold condition, indicates that node 200 is being powered by a generator 120 instead of by AC electric power grid 106. Conversely, an insignificant difference between $V_{AC}$ before the power outage and $V_{AC}$ after the apparent conclusion of the power outage, e.g., a difference that does not meet the predetermined threshold condition, indicates that node 200 is being powered by AC electric power grid 106 instead of by a generator 120.

Referring again to FIG. 1, classification system 102 is accordingly configured to classify an AC electric power source providing AC electric power to a node 114 after an apparent conclusion of a power outage on AC electric power grid 106 from measurement data M generated both before the power outage and after the apparent conclusion of the power outage. For example, suppose AC electric power grid 106 experiences a power outage at location 116(1). The power outage may be of short duration such that node 114(1) resumes being powered from AC electric power grid 106 shortly after occurrence of the power outage. On the other hand, the power outage may be of long duration such that a backup battery of node 114(1) is depleted and generator 120(1) therefore provides AC electric power to node 114(1) in place of AC electric power grid 106, such that the power outage appears to have concluded due to presence of AC electric power at node 114(1). Certain embodiments of classification system 102 are configured to classify an AC electric power source powering node 114(1) after the apparent conclusion of the power outage as either AC electric power grid 106 or generator 120, from measurement data M generated by sensor 122(1) both before the power outage and after the apparent conclusion of the power outage. Certain embodiments of classification system 102 are configured to perform such classification a plurality of times based on different respective measurement data M, such as to increase confidence that the classification is correct and/or to determine if the classification should be changed.

Figure 4:
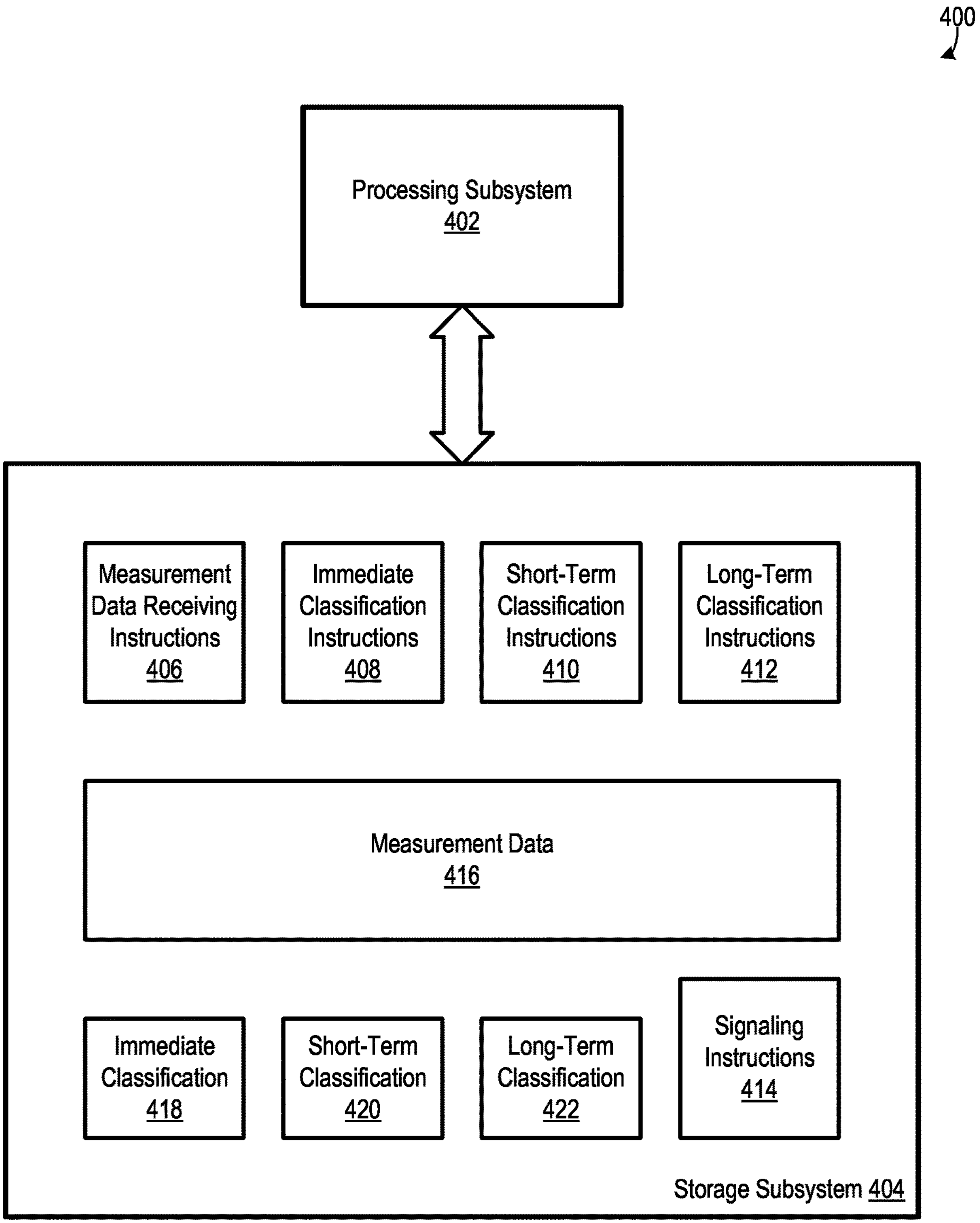
FIG. 4 is a block diagram of a classification system, according to an embodiment.

FIG. 4 is a block diagram of a classification system 400 which is one possible embodiment of classification system 102 of FIG. 1, although it is understood that classification system 102 could be embodied in other manners without departing from the scope hereof. While classification system 400 of FIG. 4 is discussed below in the context of classifying an AC electric power source providing AC electric power to node 114(1) after an apparent conclusion a power outage, is understood that classification system 400 could classify an AC electric power source providing AC electric power to another node 114 of communication network 108 in a manner analogous to that discussed with respect to node 114(1). Additionally, the discussion of FIG. 4 assumes that node 114(1) is embodied according to node 200 of FIG. 2, although it understood that node 114(1) could be embodied in another manner without departing the scope hereof.

Classification system 400 includes a processing subsystem 402 communicatively coupled to a storage subsystem 404. While processing subsystem 402 and storage subsystem 404 are each depicted as being a single respective element, each of these subsystems could be embodied by multiple elements that need not be co-located. For example, in particular embodiments, processing subsystem 402 and storage subsystem 404 are embodied by a distributed computing system, such as a cloud computing system. Additionally, processing subsystem 402 and/or storage subsystem 404 could be shared with one or more additional systems, such as malfunction identification system 104 of FIG. 1. Furthermore, while processing subsystem 402 and storage subsystem 404 are depicted as being separate elements, in certain embodiments, processing subsystem 402 and storage subsystem 404 are partially or fully combined.

Storage subsystem 404 is configured to store instructions, such as in the form of firmware and/or software, for execution by processing subsystem 402. For example, FIG. 4 illustrates storage subsystem 404 storing measurement data receiving instructions 406, immediate classification instructions 408, short-term classification instructions 410, long-term classification instructions 412, and signaling instructions 414, for execution by processing subsystem 402. Additionally, storage subsystem 404 is configured to store data, such as for use by classification system 400 or for classification system 400 to transmit to an external system. For example, FIG. 4 illustrates storage subsystem 404 storing measurement data 416 from one or more sensors 122, an immediate classification 418, a short-term classification 420, and a long-term classification 422. However, the instructions and data stored in storage subsystem 404 could vary. For example, as discussed below, classification system 400 is configured to perform three classifications, i.e., an immediate classification based on immediate classification instructions 408, a short-term classification based on short-term classification instructions 410, and a long-term classification based on long-term classification instructions 412. Some alternate embodiments of classification system 400, though, are configured to perform a different quantity of classifications, such as only two classifications or only one classification, and these alternate embodiments may therefore include a different quantity of classifications instructions and corresponding classifications in storage subsystem 404. For example, in an alternate embodiment of classification system 400 that does not perform a long-term classification, long-term classification instructions 412 and long-term classification 422 are each omitted from storage subsystem 404.

In some embodiments, classification system 400 receives notification of a power outage from an external system. In some other embodiments, classification system 400 internally identifies a power outage from measurement data M, such as in response to measurement data M indicating that magnitude of voltage $V_{AC}$ has dropped below a minimum threshold value. The minimum threshold value is, for example, a minimum permissible magnitude of voltage $V_{AC}$.

Figure 5:
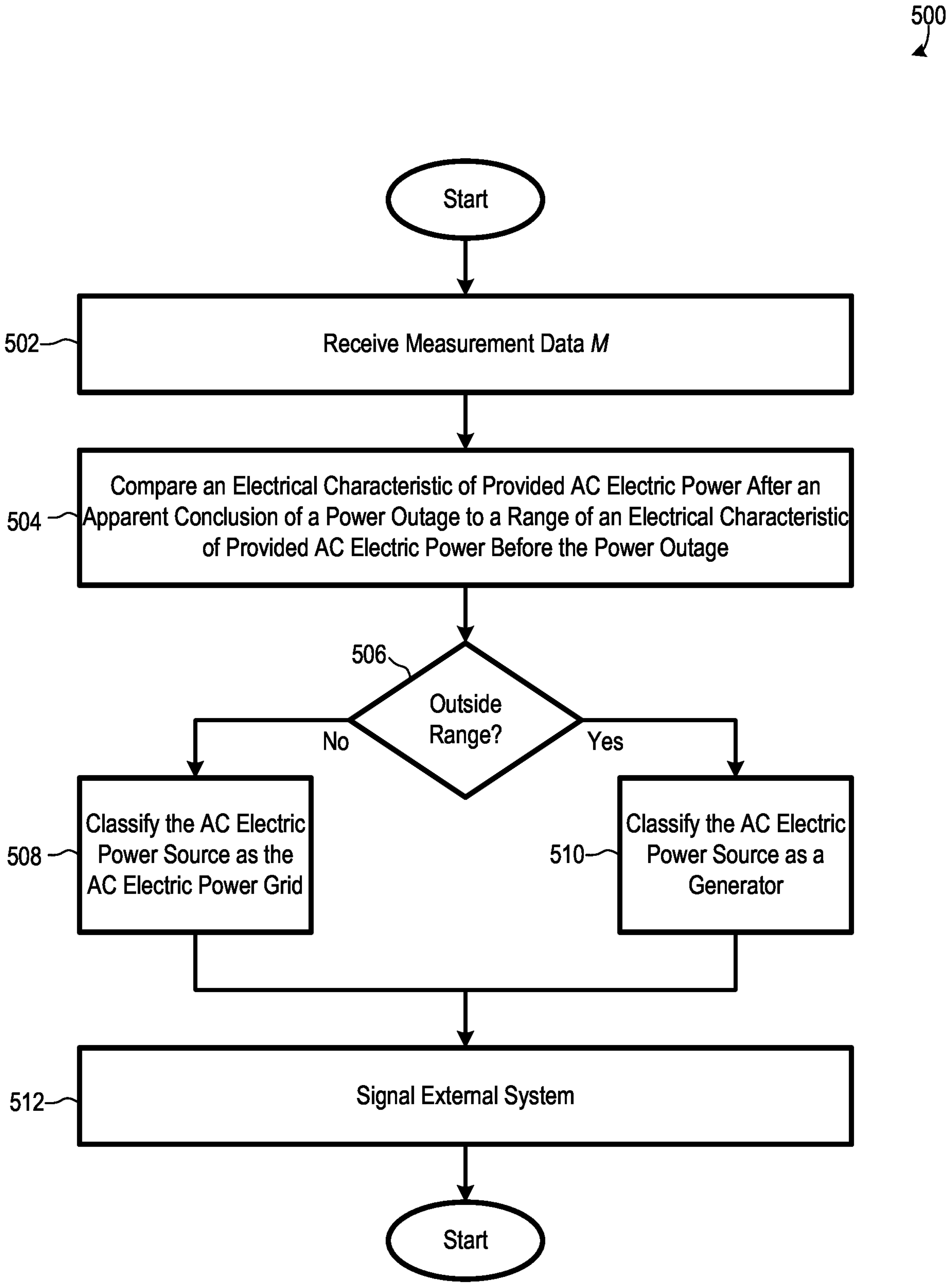
FIG. 5 is a flow chart of a method for performing an immediate classification of an alternating current (AC) electric power source powering a node of a communication network after an apparent conclusion of a power outage, according to an embodiment.

FIG. 5 is a flow chart of a method 500 for classifying an AC electric power source powering node 114(1) after an apparent conclusion of a power outage on AC electric power grid 106 at location 116(1), which is one example of how classification system 400 may perform an immediate classification of an AC electric power source powering a node 114 of communication network 108 after an apparent conclusion a power outage. In a block 502 of method 500, processing subsystem 402 executes measurement data receiving instructions 406 to receive measurement data M(1) from sensor 122(1) via communication network 108. Measure data M(1) is stored as measurement data 416 in storage subsystem 404.

Processing subsystem 402 executes immediate classification instructions 408 to perform blocks 504-510 of method 500. In block 504 of method 500, processing subsystem 402 executes immediate classification instructions 408 to compare (i) an electrical characteristic of AC electric power provided to node 114(1) at a time $t_1$ after an apparent conclusion of the power outage, e.g., when voltage $V_{AC}$ on first power bus 204 has returned to an acceptable range after being outside of the acceptable range, to (ii) a range of an electrical characteristic of AC electric power provided to node 114(1) during a historical time period $T_h$ before the power outage. The electrical characteristic of AC electric power provided to node 114(1) includes, for example, RMS magnitude of voltage $V_{AC}$, peak-to-peak magnitude of voltage $V_{AC}$, instantaneous magnitude of voltage $V_{AC}$, frequency of voltage $V_{AC}$, noise content of voltage $V_{AC}$, and/or harmonic content of voltage $V_{AC}$. As one example of block 504, assume that (i) the electrical characteristic of AC electric power provided to node 114(1) is RMS magnitude of voltage $V_{AC}$, (ii) the RMS magnitude of voltage $V_{AC}$ at time $t_1$ is $V_{AC\_1}$, and (iii) RMS magnitude of voltage $V_{AC}$ ranged from $V_{AC\_min}$ to $V_{AC\_max}$ during a one hour period immediately before the power outage. In this example, processing subsystem 402 would compare $V_{AC\_1}$ to a range bounded by $V_{AC\_min}$ to $V_{AC\_max}$ in block 504 to determine whether $V_{AC\_1}$ is within the range or outside of the range.

In a decision block 506, processing subsystem 402 executes immediate classification instructions 408 to determine, based on the comparison performed in block 504, whether the electrical characteristic of the AC electric power provided to node 114(1) at time $t_1$ is within the range of the electrical characteristic of the AC electric power provided to node 114(1) during the historical time period $T_h$. If the result of decision block 506 is no, method 500 proceeds to a block 508, and if the result of decision block 506 is yes, method 500 proceeds to a block 510. In block 508, processing subsystem 402 executes immediate classification instructions 408 to generate immediate classification 418 (FIG. 4) indicating that AC electric power grid 106, and not generator 120(1), is powering first node 114(1) at time $t_1$. In block 510, processing subsystem 402 executes immediate classification instructions 408 to generate immediate classification 418 indicating that generator 120(1), and not AC electric power grid 106, is powering first node 114(1) at time $t_1$. Method proceeds from either of block 508 or block 510 to a block 510 where processing subsystem 402 executes signaling instructions 414 to transmit a classification signal 124 (FIG. 1) to external system 110, where classification signal 124 includes immediate classification 418.

An immediate classification performed by classification system 400 may consider only a single measurement data 416 value generated by sensor 122(1) after the apparent conclusion of the power outage, such as discussed above with respect to the FIG. 5 example. Consequently, particular embodiments of classification system 400 may advantageously quickly generate immediate classification 418. However, immediate classification 418 may not be accurate in all circumstances due to it being based on only one measurement data 416 value generated after the apparent conclusion of the power outage. Therefore, particular embodiments of classification system 400 are further configured to perform classification of an AC electric power source powering a node 114 by performing short-term and/or long-term statistical analysis of measurement data 416, such as to achieve greater confidence in classification of the AC electric power source than that based on immediate classification alone or to determine whether a node 114 has resumed receiving AC electric power from AC electric power grid 106 after being powered by a generator. Examples of such statistical analysis include, but are not limited to, one or more of efficiency statistical analysis, change point statistical analysis, and distribution statistical analysis, of measurements data values spanning a time duration before the power outage and a time duration after the power outage.

Figure 6:
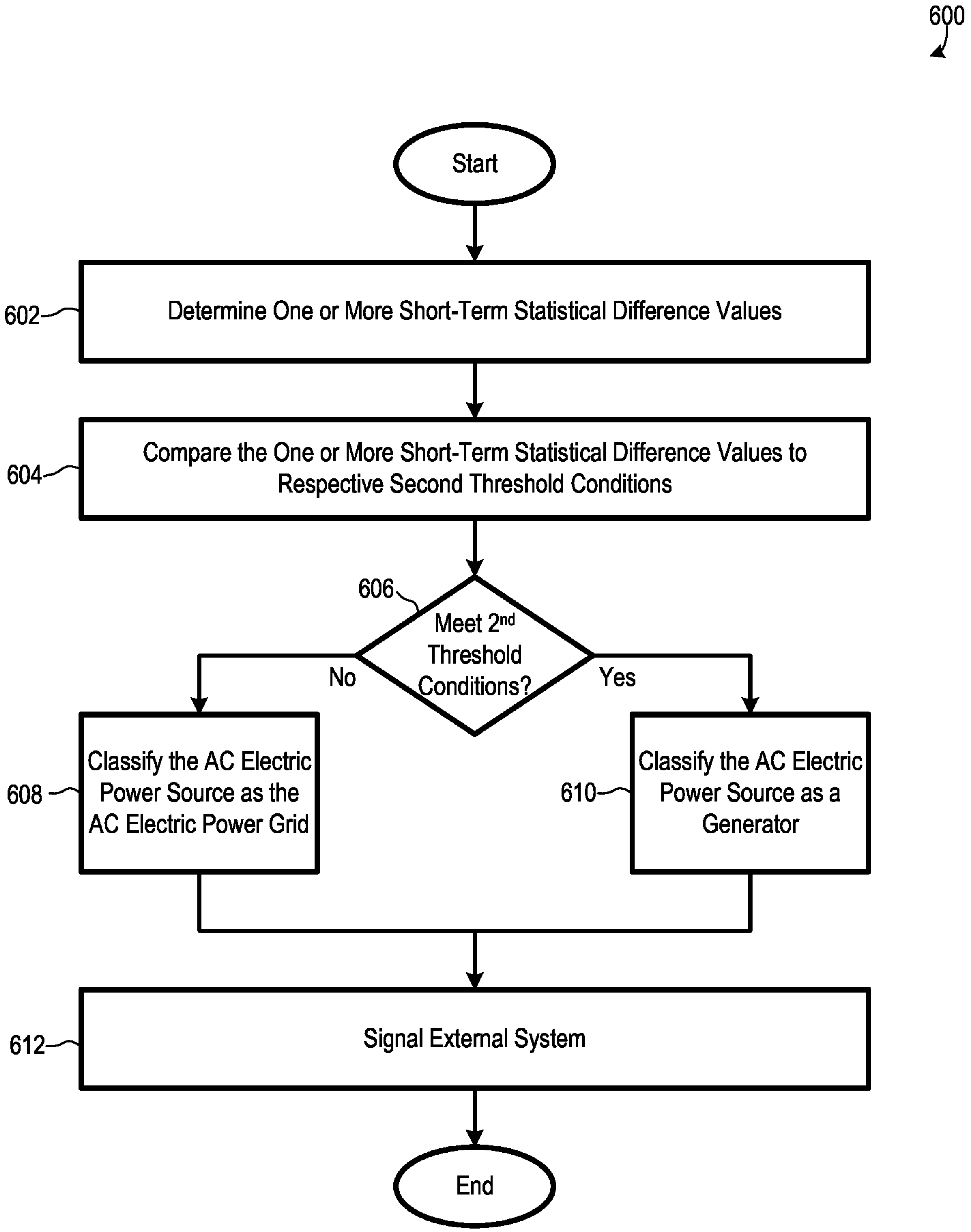
FIG. 6 is a flow chart of a method for performing a short-term classification of an AC electric power source powering a node of a communication network after an apparent conclusion of a power outage, according to an embodiment.

FIG. 6 is a flow chart of a method 600 for classifying an AC electric power source powering node 114(1) after an apparent conclusion of a power outage on AC electric power grid 106 at location 116(1), which is one example of how classification system 400 may perform a short-term classification of an AC electric power source powering a node 114 of communication network 108 after the apparent conclusion of a power outage. In some embodiments, classification system 400 performs method 600 after performing method 500 of FIG. 5. Processing subsystem 402 executes short-term classification instructions 410 to perform blocks 602-610 of method 600. In block 602 of method 600, processing subsystem 402 executes short-term classification instructions 410 to perform short-term statistical analysis of measurement data 416 to determine one or more short-term statistical difference values between (i) electrical characteristics of AC electric power provided to node 114(1) over a first time duration, the first time duration being before the power outage on AC electric power grid 106 at location 116(1), and (ii) electrical characteristics of AC electric power provided to node 114(1) over a second time duration, the second time duration being after the apparent conclusion of the power outage on AC electric power grid 106 at location 116(1), e.g., when voltage $V_{AC}$ on first power bus 204 has returned to an acceptable range after being outside of the acceptable range. Examples of electrical characteristics of AC electric power provided to node 114(1) include, but are not limited to, RMS magnitude of voltage $V_{AC}$, peak-to-peak magnitude of voltage $V_{AC}$, instantaneous magnitude of voltage $V_{AC}$, frequency of voltage $V_{AC}$, and/or harmonic content of voltage $V_{AC}$. In certain embodiments, the first time duration is a one hour duration preceding the power outage, e.g., a one hour duration immediately preceding the power outage, and the second time duration is a one hour duration after the apparent conclusion of the power outage, e.g., a one hour duration immediately after the apparent conclusion of the power outage. In general, the greater each short-term statistical difference value, the greater the likelihood an AC electric power source providing electric power to node 114(1) after the apparent conclusion of the power outage is different than the AC electric power source providing electric power to node 114(1) before the power outage.

In some embodiments, all measurement data 416 generated within the first time duration is equally weighted, and all measurement data 416 generated within the second time duration is equally weighted, when determining the one or more short-term statistical difference values. In some other embodiments, though, measurement data 416 generated within the first time duration and/or measurement data generated during the second time duration is unequally weighted when determining the one or more short-term statistical difference values, such as to realize a recency bias.

Discussed below are three examples of different types of short-term statistical difference values that processing subsystem 402 may determine in block 602. Processing subsystem 402 may be configured to determine one, two, or all three of the following example types of short-term statistical difference values. However, processing subsystem 402 is not limited to determining the following example types of short-term statistical difference values, and processing subsystem 402 could instead be configured to determine one or more other types of short-term statistical difference values in place of, or in addition to, the example types of short-term statistical difference values discussed below.

A. Efficiency Statistical Analysis

Certain embodiments of processing subsystem 402 are configured to perform efficiency statistical analysis of measurement data 416 to determine a short-term statistical difference value representing what fraction of measurement data 416 generated within the second time duration does not lie within a minimum to maximum range of measurement data 416 generated within the first time duration. While not required, particular embodiments of processing subsystem 402 are configured to use a Beta function when performing efficiency statistical analysis, such as according to EQN. 1 below, where DV_EF is a short-term statistical difference value determined using efficiency statistical analysis, $B_{lower}$ is a Beta probability that measurement data 416 generated during the second time duration lies below a predetermined maximum value, and $B_{upper}$ is a Beta probability that measurement data 416 generated during the second time duration lies above a predetermined minimum value. The predetermined maximum and minimum values are, for example, the respective maximum and minimum values of measurement data 416 generated during the first time duration.

$$DV\_EF = 1 - B_{lower} * B^{upper} \quad \text{(EQN. 1)}$$

Figure 7:
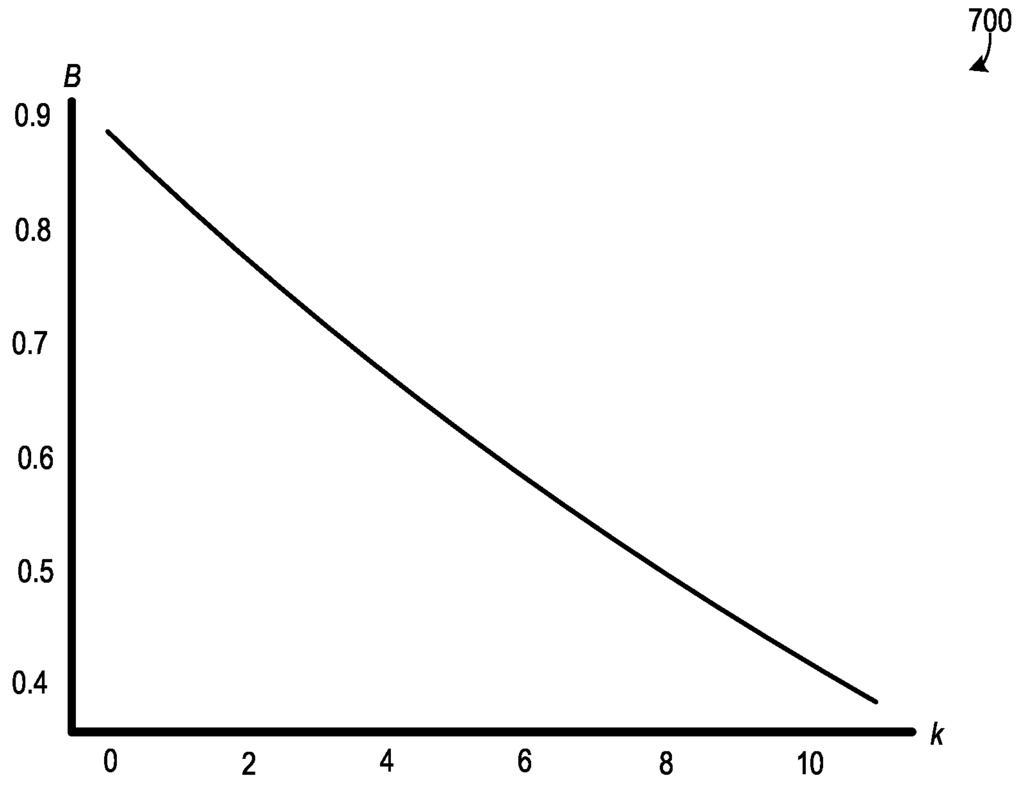
FIG. 7 is a graph of Beta probability versus number of non-conforming values.

As known in the art of statistics, a Beta probability distribution has arguments x, α, and β, where x is a confidence level, α is a number of conforming samples (below the predetermined maximum value for $B^{lower}$ and above the predetermined minimum value for $B^{upper}$), and β is a total number of samples. Accordingly, each Beta probability can be defined for EQN. 1 as B(x, β-k, β) where x is a confidence level, k is a number of non-conforming values of measurement data 416 generated during the second time duration, and β is a total number of measurement data 416 values generated during the first and second time durations. A non-conforming value of measurement data 416 when determining $B_{lower}$ in EQN. 1 is a value of measurement data 416 that lies above a maximum value of all measurement data 416 values generated during the first time duration. A non-conforming value of measurement data 416 when determining $B^{upper}$ in EQN. 1 is a value of measurement data 416 that lies below a minimum value of all measurement data 416 values generated during the first time duration. FIG. 7 is a graph 700 of B(x, β-k, β) versus k where (i) x is 0.95, (ii) β is 24, (iii) 12 of the 24 total samples were generated during the first time duration, and (iv) 12 of the 24 total samples were generated during the second time duration. As evident from FIG. 7, Beta probability B decreases with increasing value of k. Accordingly, DV_EF will increase with increasing difference between values of measurement data 416 generated during the second time duration and values of measurement data 416 generated during the first time duration. As such, the greater the value of DV_EF, the greater the likelihood that an AC electric power source providing AC electric power to node 114(1) during the second time duration is different from the AC electric power source providing AC electric power to node 114(1) during the first time duration.

B. Change Point Statistical Analysis

Certain embodiments of processing subsystem 402 are configured to perform change point statistical analysis of the measurement data 416 to determine a short-term statistical difference value (DV_CP) distinguishing between measurement data 416 generated within the second time duration to measurement data 416 generated within the first time duration. While not required, particular embodiments of processing subsystem 402 are configured to use the following cumulative sum procedure to determine short-term statistical difference value DV_CP. First, processing subsystem 402 calculates $S_0$ through $S_n$ according to EQN. 2 below, where n is a total number of measurement data 416 values in a lookback period (union of the first and second time durations), $V_n$ is the nth value of measurement data 416 in the lookback period, and $V_{avg}$ is an average value of measurement data 416 in the lookback period.

$$S_0 = 0; S_1 = S_0 + V_1 - V_{avg}; \ \ldots \ S_n = S_{n-1} + V_{n-1} - V_{avg} \quad \text{(EQN. 2)}$$

Processing subsystem 402 next calculates $S_{diff}$ using EQN. 3 below. Processing subsystem 402 subsequently performs a bootstrap by randomly shuffling the n values of Si and recalculating $S_{diff}$ to give $S_{diff}^0$. Processing subsystem 402 repeats this process N times. In some embodiments, N is 500, 1,000, 2,000, or more. Processing subsystem 402 next determines a confidence level of whether a changepoint has occurred, i.e., node 114(1) is being powered by a different AC electric power source after the apparent conclusion of the power outage than before the power outage, by counting the number of times that $S_{diff}^i$ is less than $S_{diff}$ and dividing the number by N. This confidence level is a short-term statistical difference value DV_CP, and the greater the value of DV_CP, the greater the likelihood that node 114(1) is being powered by a different AC electric power source after the apparent conclusion of the power outage than before the power outage.

$$S_{diff} = S_{max} - S_{min} = \max_{i=0, \ldots n} S_i - \min_{i=0, \ldots n} S_i \quad \text{(EQN. 3)}$$

C. Distribution Statistical Analysis

Certain embodiments of processing subsystem 402 are configured to perform distribution statistical analysis of the measurement data 416 to determine a short-term statistical difference value DV_DA indicating to what extent measurement data 416 generated within the second time duration is different from measurement data 416 generated within the first time duration. While processing subsystem 402 is not limited to performing any particular type of distribution statistical analysis, some embodiments of processing subsystem 402 execute short-term classification instructions 410 to determine short-term statistical difference value DV_DA using the Kuiper statistic to express to what extent a distribution of measurement data 416 generated by sensor 122(1) during the second time duration differs from a distribution of measurement data 416 generated by sensor 122(1) during the first time duration.

Referring again to FIG. 6, method 600 proceeds from block 602 to block 604 where processing subsystem 402 executes short-term classification instructions 410 to compare the one or more short-term statistical difference values determined in block 602 to respective second threshold conditions indicating that node 114(1) is being powered by a different AC electric power source after the apparent conclusion of the power outage than before the power outage. The number of comparisons performed in block 604 will be the same as the number of short-term statistical difference values determined in block 602. For example, if two short-term statistical difference values are determined in block 602, two comparisons will be performed in block 604, i.e., a respective comparison will be performed for each of the two short-term statistical difference values. While classification system 400 is not limited to using any particular second threshold values in block 604, certain embodiments of classification system 400, which are configured to determine one or more of short-term statistical values DV_EF, DV_CP, and DV_DA discussed above, use the threshold conditions of Table 1 below when performing the comparison of block 604. The DV_EF threshold condition of Table 1 assumes that DV_EF is determined using a Beta function as discussed above, the DV_CP threshold condition of Table 1 assumes that DV_CP is determined using the cumulative sum procedure discussed above, and the DV_DA threshold condition of Table 1 assumes that DV_DA is determined using the Kuiper statistic.

TABLE 1

| Short-Term Statistical Difference Value | Threshold Condition |
|---|---|
| DV_EF | DV_EF > 0.2 |
| DV_CP | DV_CP > 0.9 |
| DV_DA | DV_DA > 0.5 |

Method 600 proceeds from block 604 to a decision block 606 where processing subsystem 402 executes short-term classification instructions 410 to determine, based on the one or more comparisons performed in block 604, whether the one or more short-term statistical difference values meet their respective second threshold conditions. In some embodiments where there are two or more short-term statistical difference values, the result of decision block 606 is yes only if all of the short-term statistical difference values meet their respective second threshold conditions. In some other embodiments where there are two or more short-term statistical difference values, decision block 606 may be executed such that result of decision block 606 is yes if at least one of the short-term statistical difference values meets its respective second threshold condition, if a majority of the short-term statistical difference values meet their respective second threshold conditions, etc. Additionally, in some embodiments where there are two or more short-term statistical difference values, processing subsystem 402 may determine whether the result of decision block is yes based on an algorithm that considers the short-term statistical difference values, optionally with different weighting of two or more of the short-term statistical difference values.

If the result of decision block 606 is no, method 600 proceeds to a block 608, and if the result of decision block 606 is yes, method 600 proceeds to a block 610. In block 608, processing subsystem 402 executes short-term classification instructions 410 to generate short-term classification 420 (FIG. 4) indicating AC electric power grid 106, and not generator 120(1), is powering first node 114(1) during the second time duration, in response to the one or more short-term statistical difference values not meeting their respective second threshold conditions. In block 610, processing subsystem 402 executes short-term classification instructions 410 to generate short-term classification 420 indicating that generator 120(1), and not AC electric power grid 106, is powering first node 114(1) during the second time duration, in response to the one or more short-term statistical difference values meeting their respective second threshold conditions. Method 600 proceeds from either of block 608 or block 610 to a block 612 where processing subsystem 402 executes signaling instructions 414 to transmit a classification signal 124 (FIG. 1) to external system 110, where classification signal 124 includes short-term classification 420.

Figure 8:
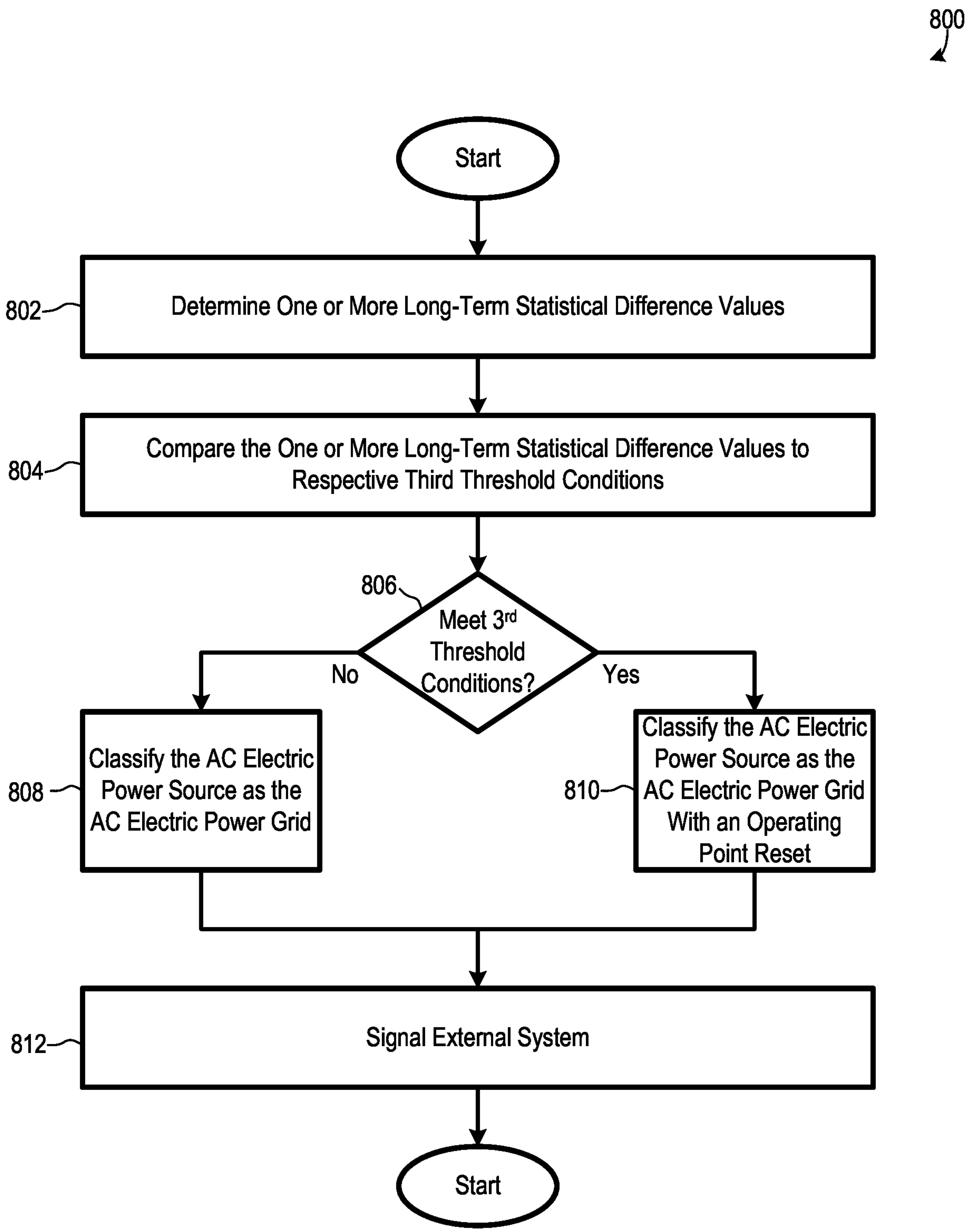
FIG. 8 is a flow chart of a method for performing a long-term classification of an AC electric power source powering a node of a communication network after an apparent conclusion of a power outage, according to an embodiment.

FIG. 8 is a flow chart of a method 800 for classifying an AC electric power source powering node 114(1) after an apparent conclusion of a power outage on AC electric power grid 106 at location 116(1), which is one example of how classification system 400 may perform a long-term classification of an AC electric power source powering a node 114 of communication network 108 after an apparent conclusion of a power outage. In some embodiments, classification system 400 performs method 800 after performing method 600 of FIG. 6. Processing subsystem 402 executes long-term classification instructions 412 to perform blocks 802-810 of method 800. In block 802 of method 800, processing subsystem 402 executes long-term classification instructions 412 to perform long-term statistical analysis of measurement data 416 to determine one or more long-term statistical difference values between (i) electrical characteristics of AC electric power provided to node 114(1) over a third time duration, the third time duration being before the power outage on AC electric power grid 106 at location 116(1), and (ii) electrical characteristics of AC electric power provided to node 114(1) over a fourth time duration, the fourth time duration being after the apparent conclusion of the power outage on AC electric power grid 106 at location 116(1), e.g., when voltage $V_{AC}$ on first power bus 204 has returned to an acceptable range after being outside of the acceptable range. The third duration may the same as, or different from, the first time duration of method 600. Examples of electrical characteristics of AC electric power provided to node 114(1) include, but are not limited to, RMS magnitude of voltage $V_{AC}$, peak-to-peak magnitude of voltage $V_{AC}$, peak-to-trough magnitude of voltage $V_{AC}$, instantaneous magnitude of voltage $V_{AC}$, frequency of voltage $V_{AC}$, and/or harmonic content of voltage $V_{AC}$. In certain embodiments, the third time duration is a one hour duration preceding the power outage, e.g., a one hour duration immediately preceding the power outage, and the fourth time duration is a one hour duration beginning six hours after the apparent conclusion of the power outage.

In some embodiments, all measurement data 416 generated within the third time duration is equally weighted, and all measurement data 416 generated within the fourth time duration is equally weighted, when determining the one or more long-term statistical difference values. In some other embodiments, though, measurement data 416 generated within the third time duration and/or measurement data generated during the fourth time duration is unequally weighted when determining the one or more long-term statistical difference values, such as to realize a recency bias. In particular embodiments, processing subsystem 402 determines long-term statistical difference values in a manner similar to how processing subsystem 402 determines short-term statistical difference values, but using measurement data 416 generated at a different time after the apparent conclusion of the power outage. For example, in some embodiments, processing subsystem 402 determines long-term statistical difference values using one or more of efficiency statistical analysis, change point statistical analysis, and distribution statistical analysis, in a manner similar to that discussed above with respect to block 602 of method 600.

Method 800 proceeds from block 802 to block 804 where processing subsystem 402 executes long-term classification instructions 412 to compare the one or more long-term statistical difference values determined in block 802 to respective third threshold conditions indicating a difference between the AC electric power source powering node 114(1) after apparent conclusion of the power outage and the AC electric power source powering node 114(1) before the power outage. The number of comparisons performed in block 804 will be the same as the number of long-term statistical difference values determined in block 802. While classification system 400 is not limited to using any particular third threshold values in block 804, certain embodiments of classification system 400 are configured to use the threshold conditions of Table 1 above when performing the comparison of block 804.

Method 800 proceeds from block 804 to a decision block 806 where processing subsystem 402 executes long-term classification instructions 412 to determine, based on the one or more comparisons performed in block 804, whether the one or more long-term statistical difference values meet their respective third threshold conditions. In some embodiments where there are two or more long-term statistical difference values, the result of decision block 806 is yes only if all of the long-term statistical difference values meet their respective third threshold conditions. In some other embodiments where there are two or more long-term statistical difference values, decision block 806 may be executed such that result of decision block 806 is yes if at least one of the long-term statistical difference values meets its respective third threshold condition, if a majority of the long-term statistical difference values meet their respective third threshold conditions, etc. Additionally, in some embodiments where there are two or more long-term statistical difference values, processing subsystem 402 may determine whether the result of decision block 806 is yes based on an algorithm that considers the long-term statistical difference values, optionally with different weighting of two or more of the long-term statistical difference values.

If the result of decision block 806 is no, method 800 proceeds to a block 808, and if the result of decision block 806 is yes, method 800 proceeds to a block 810. In block 808, processing subsystem 402 executes long-term classification instructions 412 to generate long-term classification 422 (FIG. 4) indicating AC electric power grid 106, and not generator 120(1), is powering first node 114(1) during the fourth time duration, in response to the one or more long-term statistical difference values not meeting their respective third threshold conditions. It should be noted that classifying the AC electric power source powering node 114(1) in the fourth time duration as AC electric power grid 106 does not preclude node 114(1) from being powered by a generator 120 during the second time duration. In block 810, processing subsystem 402 executes long-term classification instructions 412 to generate long-term classification 422 indicating that AC electric power grid 106 is powering first node 114(1) with an operating point reset during the fourth time duration, in response to the one or more long-term statistical difference values meeting their respective third threshold conditions. The operating point reset indicates that one or more characteristics of AC electric power grid 106, such as RMS voltage of AC electric power grid 106, differs between the third and fourth time durations. Method 800 proceeds from either of block 808 or block 810 to a block 812 where processing subsystem 402 executes signaling instructions 414 to transmit a classification signal 124 (FIG. 1) to external system 110, where classification signal 124 includes long-term classification 422.

Figure 9:
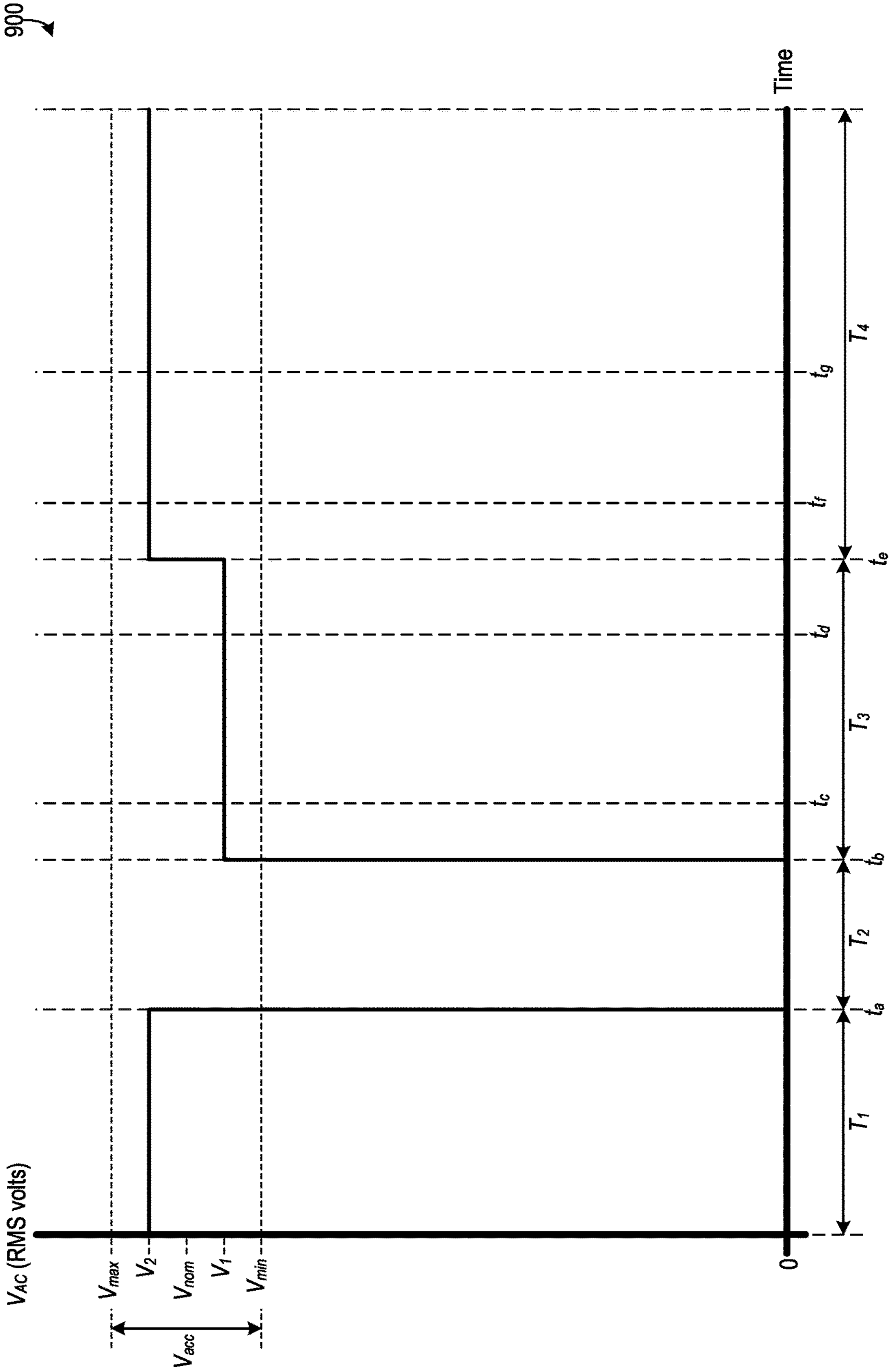
FIG. 9 is a graph of an example of AC voltage at the node of FIG. 2 where the node is powered by a generator after an apparent conclusion of a power outage.
Figure 10:
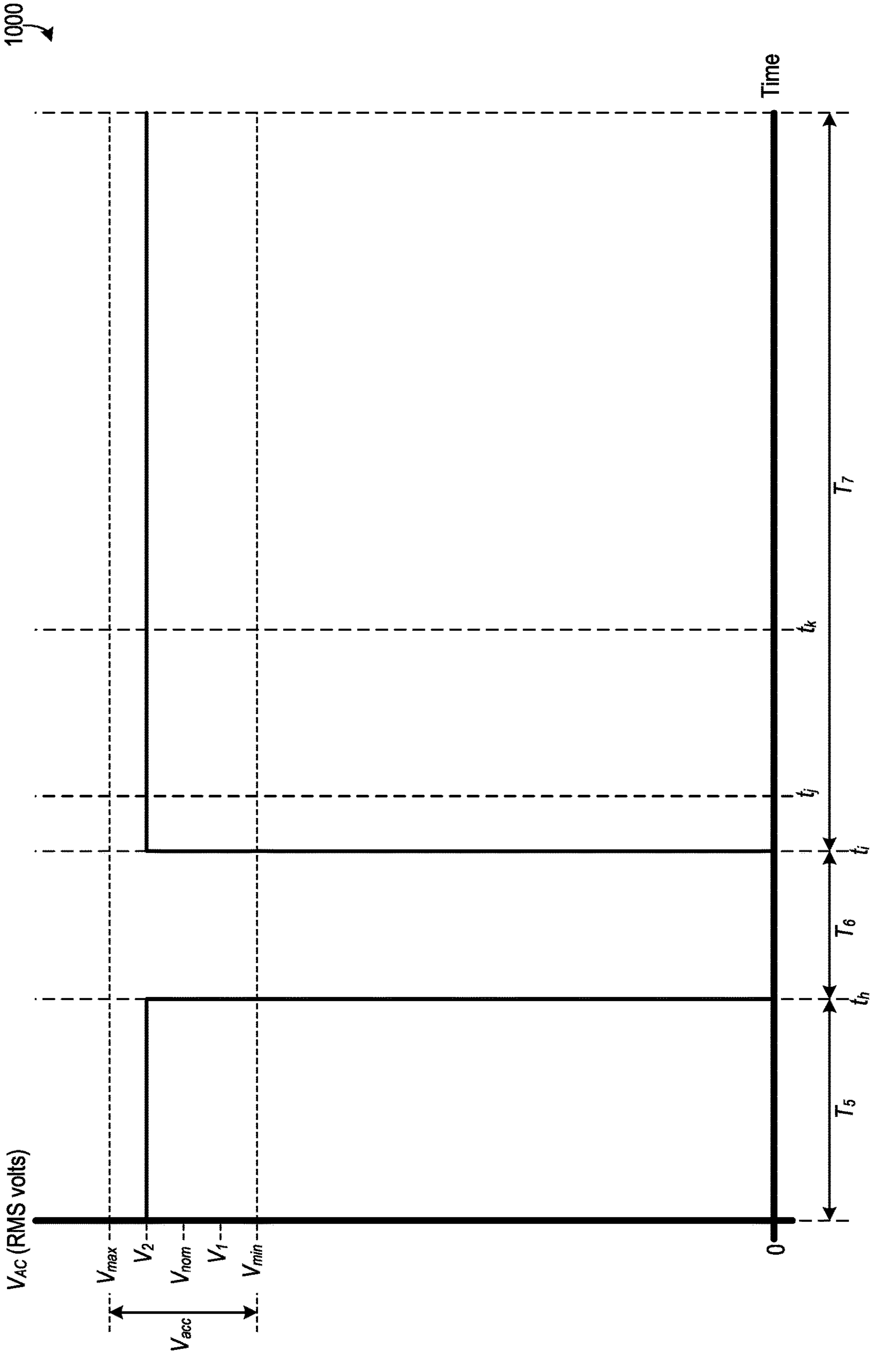
FIG. 10 is a graph of an example of AC voltage at the node of FIG. 2 where the node is powered by an AC electric power grid after an apparent conclusion of a power outage.

FIGS. 9 and 10, discussed below, illustrate two examples of voltage $V_{AC}$ of node 200 (FIG. 2) and how classification system 400 may classify an AC electric power source powering node 200 after an apparent conclusion of a power outage at a location of node 200. It is understood, though, that classification system 400 is not limited to operating according to the examples of FIGS. 9 and 10. While FIGS. 9 and 10 illustrate voltage $V_{AC}$ being non-fluctuating (flat) between events for illustrative simplicity, actual voltage $V_{AC}$ measurement data will typically include fluctuations, such as due to changes in operation of electric power grid 106 or a generator 120, changes in load 200, and/or finite resolution of a sensor generating voltage measurement data. Such fluctuations, though, are typically sufficiently small so as to not interfere with operation of classification system 400. For example, in particular embodiments, fluctuation in magnitude of voltage $V_{AC}$ will not cause classification system 400 to detect a change in state as long magnitude of voltage $V_{AC}$ remains within an acceptable range $V_{acc}$ (discussed below).

FIG. 9 is a graph 900 of an example of voltage $V_{AC}$ of node 200 in RMS volts versus time. Graph 900 indicates a nominal value $V_{nom}$ of voltage $V_{AC}$, as well as a minimum acceptable value $V_{min}$ of voltage $V_{AC}$ and a maximum acceptable value $V_{max}$ of voltage $V_{AC}$. Acceptable range $V_{acc}$ of voltage $V_{AC}$ accordingly extends from $V_{min}$ to $V_{max}$. Graph 900 includes time periods $T_1$, $T_2$, $T_3$, and $T_4$. Time period $T_1$ corresponds to a time period before a power outage at the location of node 200, where node 200 is being powered by AC electric power grid 106 and $V_{AC}$ has a value of $V_2$. As shown in graph 900, value $V_2$ is greater than nominal value $V_{nom}$, but value $V_2$ is within acceptable range $V_{acc}$ of voltage $V_{AC}$.

The power outage occurs at a time $t_a$, and voltage $V_{AC}$ therefore drops to zero at time $t_a$. Voltage $V_{AC}$ remains at zero for time period $T_2$, although node 200 may nevertheless be powered by backup battery 210 and the inverter within UPS 208 during time period $T_2$. Voltage $V_{AC}$ rises to a value $V_1$ at a time $t_b$, where value $V_1$ is lower than value $V_2$ within acceptable range $V_{acc}$ of voltage $V_{AC}$. Voltage $V_{AC}$ remains at value $V_1$ for time period $T_3$. The fact that voltage $V_{AC}$ rises to a value within acceptable range $V_{acc}$ of voltage $V_{AC}$ at time $t_b$ indicates an apparent conclusion of the power outage at time $t_b$. However, the fact that voltage $V_{AC}$ has a value ($V_1$) during time period $T_3$ that is significantly different from the value ($V_2$) of voltage $V_{AC}$ during time period $T_1$ indicates that node 200 is being powered by an AC electric power source other than AC electric power grid 106 during time period $T_3$. Accordingly, classification system 400 may perform an immediate classification at time $t_b$ to determine that a generator 120 is powering node 200 during time period $T_3$, due to the difference in RMS magnitude of voltage $V_{AC}$ between time periods $T_1$ and $T_3$. Classification system 400 may additionally perform a short-term classification at time $t_c$ and a long-term classification at time $t_d$ to increase confidence that node 200 is being powered by a generator 120 in time period $T_3$. The actual times that the short-term classification and the long-term classification are performed in time period $T_3$ optionally may vary, although the short-term classification will always be performed before the long-term classification. For example, the short-term classification may be performed at a time later than $t_c$, and/or the long-term classification may be performed at a time later than $t_d$, if there is significant fluctuation in magnitude of voltage $V_{AC}$ during time period $T_3$, to obtain additional data for use when performing the short-term and/or long-term classifications.

Voltage $V_{AC}$ rises from value $V_1$ to value $V_2$ at a time $t_e$, and voltage $V_{AC}$ remains at value $V_2$ for time period $T_4$. Time $t_c$ corresponds to node 200 returning to being powered from AC electric power grid 106 after being powered by the generator 120. While FIG. 9 depicts voltage $V_{AC}$ as having the same magnitude in time period $T_4$ as in time period $T_1$, magnitude of voltage $V_{AC}$ may vary between time periods $T_1$ and $T_4$, such as due to change in operation of electric power grid 106, change in load of node 200, or finite resolution of a sensor generating voltage measurement data. Classification system 400 may perform an immediate classification at time $t_e$ to determine that AC electric power grid 106 is powering node 200 during time period $T_4$, due to the difference in RMS magnitude of voltage $V_{AC}$ between time periods $T_1$ and $T_4$ being below a threshold value. Classification system 400 may additionally perform a short-term classification at a time $t_f$ and a long-term classification at time $t_g$ to increase confidence that node 200 is being powered by AC electric power grid 106 in time period $T_4$. In a manner analogous to that discussed above with respect to time period $T_3$, the actual times that the short-term classification and the long-term classification are performed in time period $T_4$ optionally may vary, although the short-term classification will always be performed before the long-term classification.

FIG. 10 is a graph 1000 of another example of voltage $V_{AC}$ of node 200 in RMS volts versus time. Graph 1000 indicates values $V_{nom}$, $V_{min}$, and $V_{max}$, which are the same as their corresponding values in graph 900 of FIG. 9. Graph 1000 also shows acceptable range $V_{acc}$ of voltage $V_{AC}$, which is the same as acceptable range $V_{acc}$ in graph 900 of FIG. 9. Graph 1000 includes time periods $T_5$, $T_6$, and $T_7$. Time period $T_5$ corresponds to a time period before a power outage at the location of node 200, where node 200 is being powered by AC electric power grid 106 and $V_{AC}$ has a value of $V_2$ within acceptable range $V_{acc}$ of voltage $V_{AC}$.

The power outage occurs at a time $t_h$ and voltage $V_{AC}$ therefore drops to zero at time $t_h$. Voltage $V_{AC}$ remains at zero for time period $T_6$, although node 200 may nevertheless be powered by backup battery 210 and the inverter within UPS 208 during time period $T_6$. Voltage $V_{AC}$ rises to value $V_2$ at a time $t_i$, and voltage $V_{AC}$ remains at value $V_2$ for time period $T_7$. The fact that voltage $V_{AC}$ rises to a value within acceptable range $V_{acc}$ of voltage $V_{AC}$ at time $t_i$ indicates an apparent conclusion of the power outage at time $t_i$. Additionally, in contrast to the example of FIG. 9, the fact that voltage $V_{AC}$ has a value of $V_2$, or a value similar to $V_2$, during time period $T_7$ indicates that node 200 is being powered by AC electric power grid 106, instead of by generator 120, during time period $T_7$. Accordingly, classification system 400 may perform an immediate classification at time $t_i$ to determine that AC electric power grid 106 is powering node 200 during time period $T_7$ due to RMS magnitude of voltage $V_{AC}$ being the same, or similar, in time periods $T_5$ and $T_7$. Additionally, classification system 400 may perform a short-term classification at a time $t_j$ and a long-term classification at a time $t_k$ to increase confidence that node 200 is being powered by AC electric power grid 106 during time period $T_7$. In a manner analogous to that discussed above with respect to time period $T_3$ of FIG. 9, the actual times that the short-term classification and the long-term classification are performed in time period $T_7$ optionally may vary, such as based on fluctuations of magnitude of voltage $V_{AC}$ in time period $T_7$, although the short-term classification will always be performed before the long-term classification.

Malfunction Identification System 104

Malfunction identification system 104 is configured to identify a malfunctioning sensor 122 in environment 100 based on measurement data M received from sensors 122. For example, in particular embodiments, malfunction identification system 104 is configured to identify a malfunctioning sensor 122 in response to measurement data M indicating that a power outage rate of the sensor 122 exceeds, such as by a predetermined threshold amount, a collective power outage rate of one or more neighboring sensors 122.

Figure 11:
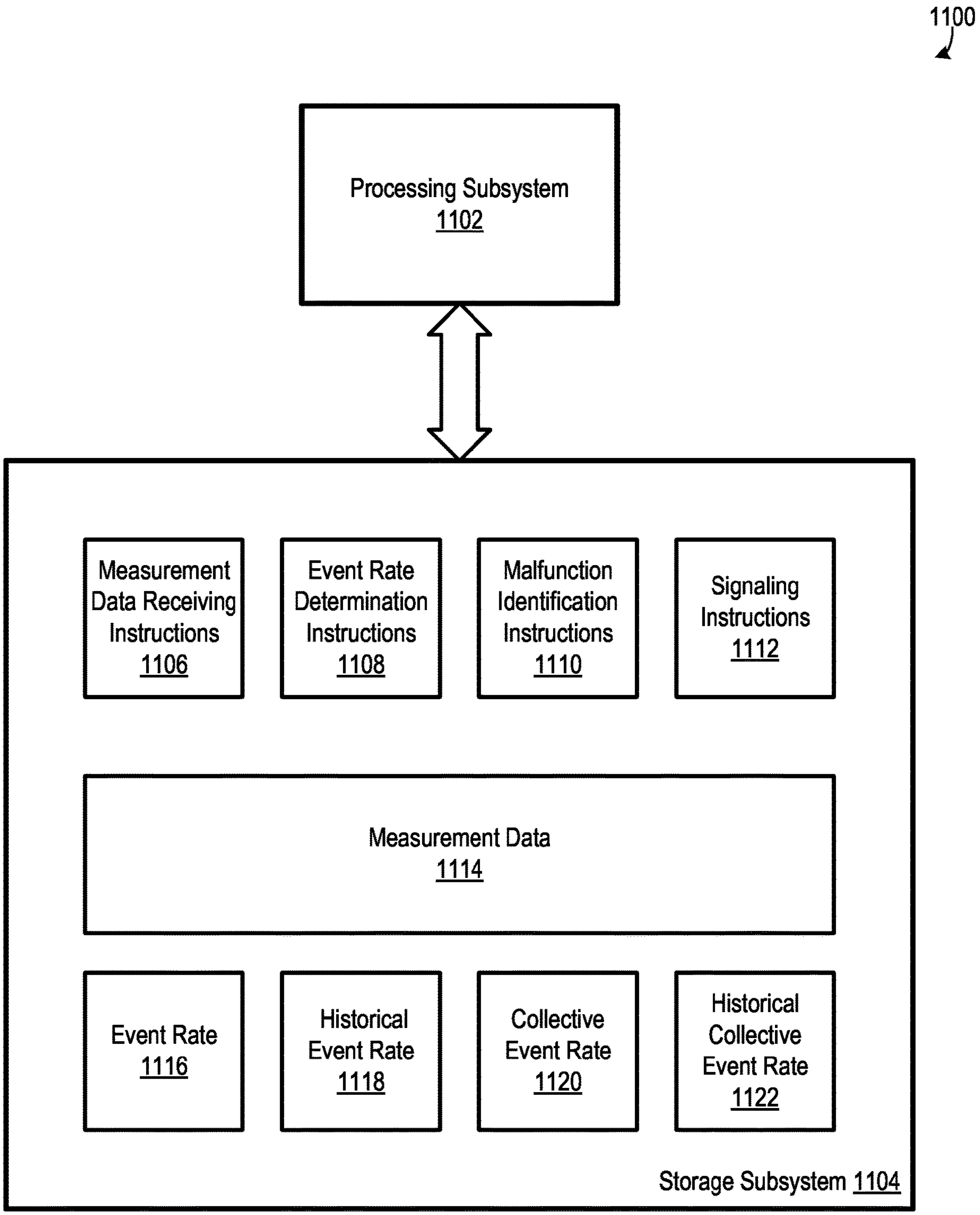
FIG. 11 is a block diagram of a malfunction identification system, according to an embodiment.

FIG. 11 is a block diagram of a malfunction identification system 1100 which is one possible embodiment of malfunction identification system 104 of FIG. 1, although it is understood that malfunction identification system 104 could be embodied in other manners without departing from the scope hereof. While malfunction identification system 1100 of FIG. 9 is discussed below in the context of determining whether sensor 122(1) is malfunctioning, it is understood that malfunction identification system 1100 could determine whether another sensor 122 is malfunctioning in a manner analogous to that discussed with respect to sensor 122(1).

Malfunction identification system 1100 includes a processing subsystem 1102 communicatively coupled to a storage subsystem 1104. While processing subsystem 1102 and storage subsystem 1104 are each depicted as being a single respective element, each of these subsystems could be embodied by multiple elements that need not be co-located. For example, in particular embodiments, processing subsystem 1102 and storage subsystem 1104 are embodied by a distributed computing system, such as a cloud computing system. Additionally, processing subsystem 1102 and/or storage subsystem 1104 could be shared with one or more additional systems, such as classification system 102 of FIG. 1. Furthermore, while processing subsystem 1102 and storage subsystem 1104 are depicted as being separate elements, in certain embodiments, processing subsystem 1102 and storage subsystem 1104 are partially or fully combined.

Storage subsystem 1104 is configured to store instructions, such as in the form of firmware and/or software, for execution by processing subsystem 1102. For example, FIG. 11 illustrates storage subsystem 1104 storing measurement data receiving instructions 1106, event rate determination instructions 1108, malfunction identification instructions 1110, and signaling instructions 1112, for execution by processing subsystem 1102. Additionally, storage subsystem 1104 is configured to store data, such as for use by malfunction identification system 1100 or for malfunction identification system 1100 to transmit to an external system. For example, FIG. 11 illustrates storage subsystem 1104 storing measurement data 1114 from one or more sensors 122, an event rate 1116, a historical event rate 1118, a collective event rate 1120, and a historical collective event rate 1122. However, the instructions and data stored in storage subsystem 1104 could vary.

Figure 12:
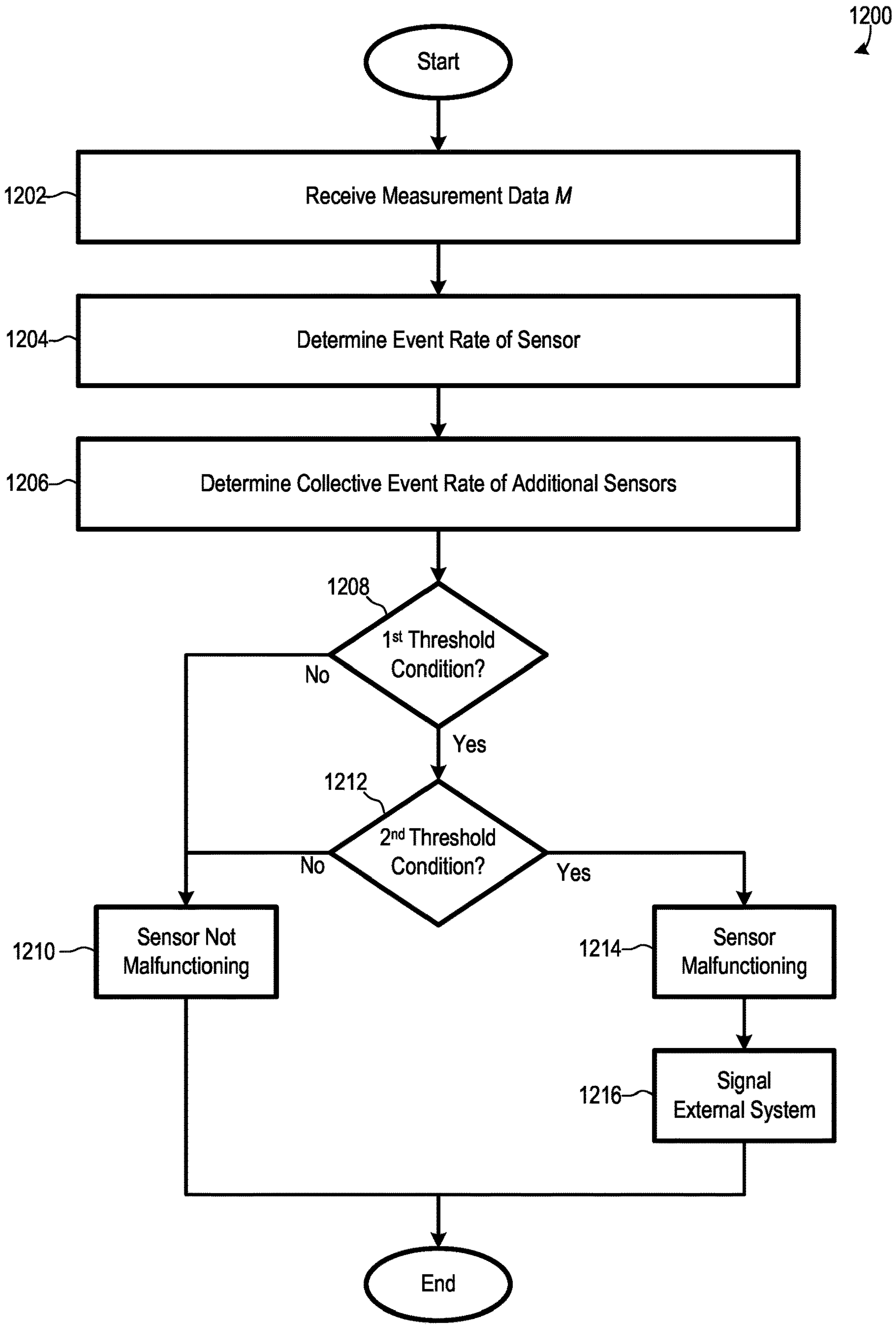
FIG. 12 is a flow chart of a method for identifying a malfunctioning sensor, according to an embodiment.

FIG. 12 is a flow chart of a method 1200 for identifying a malfunctioning sensor 122(1), which is one example of how malfunction identification system 1100 may identify a malfunctioning sensor 122 in environment 100. In a block 1202 of method 1200, processing subsystem 1102 executes measurement data receiving instructions 1106 to receive measurement data M(1) from sensor 122(1) via communication network 108. Measurement data M(1) is stored as measurement data 1114 in storage subsystem 1104.

In a block 1204 of method 1200, processing subsystem 1102 executes event rate determination instructions 1108 to determine an event rate 1116 of sensor 122(1) based on measurement data M(1) from sensor 122(1). Event rate 1116 of sensor 122(1) is rate of an electric power grid event determined from measurement data M(1) generated by sensor 122(1). For example, event rate 1116 of sensor 122(1) may be a power outage rate of AC electric power grid 106 at location 116(1) of sensor 122(1), an undervoltage event rate of AC electric power grid 106 at location 116(1) of sensor 122(1), an overvoltage event rate of AC electric power grid 106 at location 116(1) of sensor 122(1), a rate of frequency of AC electric power grid 106 at location 116(1) of sensor 122(1) being out of specification, etc. In some embodiments, event rate 1116 of sensor 122(1) is a power outage rate expressed as a System Average Interruption Duration Index (SAIDI), which is equal to a sum of all power outage durations indicated by measurement data M(1) during a test time window over a number of sensors considered when determining the power outage rate. For example, if measurement data M(1) indicates a total power outage duration of 38 minutes over a test window, processing subsystem 1102 may execute event rate determination instructions 1108 to determine event rate 1116 of sensor 122(1) according to EQN. 4 below, where number of sensors is one because event rate 1116 only expresses event rate of sensor 122(1).

$$\text{Event Rate } 1116 = \frac{\text{Sum of all power outage durations}}{\text{number of sensors}} = \frac{38 \text{ mins}}{1 \text{ sensor}} = 38 \text{ mins/sensor} \quad \text{(EQN. 4)}$$

Figure 13:
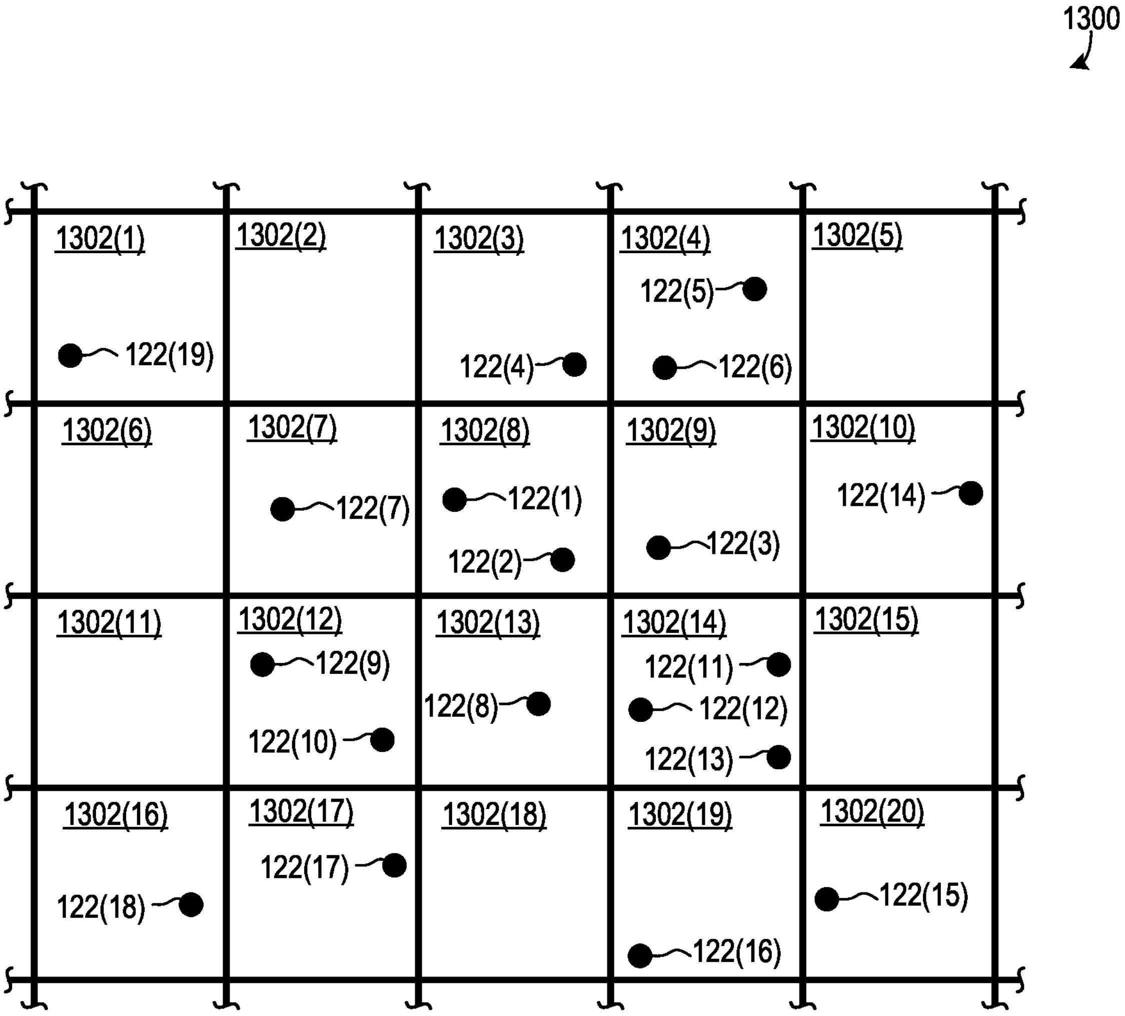
FIG. 13 is an illustration of a portion of a map showing locations of sensors, according to an embodiment.

Method 1200 proceeds from block 1204 to a block 1206 where processing subsystem 1102 executes event rate determination instructions 1108 to determine a collective event rate 1120 of one or more additional sensors 122. The additional sensors 122 are, for example, located within a predetermined proximity of sensor 122(1), such as within the same map cell as sensor 122(1), within one or more map cells that are immediately adjacent to a map cell including sensor 122(1), etc. For instance, FIG. 13 is an illustration of a portion of a map 1300 showing example locations of sensors 122. Map 1300 includes sensor 122 instances in addition to the four sensors shown in FIG. 1. Maps 1300 is divided into a plurality of cells 1302, and in some embodiments, each cell 1302 is a cell of a United States National Grid (USNG) projection system. As shown in FIG. 1, the number of sensors 122 per cell 1302 may vary. For example, some cells 1302 include zero sensors, while one cell (cell 1302(14)) includes three sensors. In particular embodiments, additional sensors 122 for purpose of determining collective event rate 1120 are sensors within the same cell 1302 as sensor 122(1), i.e., sensor 122(2). In some other embodiments, additional sensors 122 for the purpose of determining collective event rate 1120 are sensors both within the same cell 1302 as sensor 122(1) as well as sensors 122 in cells 1302 that are immediately adjacent, e.g., north, south, east, and west of the cell including sensor 122(1), e.g., sensors 122(2), 122(3), 122(7), and 122(8).

As an example of block 1206, assume that additional sensors for determining collective event rate 1120 are sensors within cell 1302(8) as well as sensors in immediately adjacent cells 1302(3), 1302(13), 1302(7), and 1302(9), such that additional sensors 122 are sensors 122(2), 122(3), 122(7), and 122(8). Additionally, assume that (i) the collective event rate is a collective power outage rate of sensors 122(2), 122(3), 122(7), and 122(8) expressed as a SAIDI and (ii) the total collective power outage duration of all sensors 122(2), 122(3), 122(7), and 122(8) over the same test window as discussed above with respect to event rate 1116 is 16 minutes. Processing subsystem 1102 may execute event rate determination instructions 1108 to determine collective event rate 1120 of additional sensors according to EQN. 5 below, where number of sensors is four.

$$\text{Event Rate } 1118 = \frac{\text{Sum of all power outage durations}}{\text{Number of sensors}} = \frac{16 \text{ mins}}{4 \text{ sensors}} = 4 \text{ mins/sensor} \quad \text{(EQN. 5)}$$

Referring again to FIG. 12, method 1200 proceeds from block 1206 to a decision block 1208 where processing subsystem 1102 executes malfunction identification instructions 1110 to whether determine event rate of 1116 of sensor 122(1) meets a first threshold condition. In some embodiments, the first threshold condition is expressed according to EQN. 6 below, where $P_{x\,\%}$(Historical Event Rate 1118) refers to the $x^{th}$ percentile of historical event rate 1118, where historical event rate 1118 is a historical event rate of sensor 122(1) over a reference period. In some embodiments, malfunction identification system 1100 determines historical event rate 1118 of sensor 122(1) from measurement data M(1) received over time, while in some other embodiments, malfunction identification system 1100 receives historical event rate 1118 of sensor 122(1) from an external system. In certain embodiments, x in EQN. 6 is 2.5. If the result of decision block 1208 is no, method 1200 proceeds to a block 1210 where processing subsystem 1102 executes malfunction identification instructions 1110 to determine that sensor 122(1) is not malfunctioning.

$$\text{Event Rate } \mathbf{1116} < P_{x\,\%}(\text{Historical Event Rate } \mathbf{1118}) \quad \text{(EQN. 6)}$$

If the result of decision block 1208 is yes, method 1200 proceeds to a decision block 1212 where processing subsystem 1102 executes malfunction identification instructions 1110 to determine whether collective event rate of 1120 of the additional sensors 122 meets a second threshold condition. In some embodiments, the second threshold condition is expressed according to EQN. 7 below, where $P_{x\,\%}$(Historical Collective Event Rate 1122) refers to the $x^{th}$ percentile of historical collective event rate 1122, where historical collective event rate 1122 is a historical event rate over a reference period of the additional sensors 122 considered when determining collective event rate 1120. In some embodiments, malfunction identification system 1100 determines historical collective event rate 1122 from measurement data M received over time, while in some other embodiments, malfunction identification system 1100 receives historical collective event rate 1122 from an external system. In certain embodiments, x in EQN. 7 is 2.5. If the result of decision block 1212 is no, method 1200 proceeds to block 1210 where processing subsystem 1102 executes malfunction identification instructions 1110 to determine that sensor 122(1) is not malfunctioning.

$$\text{Event Rate } 1120 > P_{x\%}(\text{Historical Collective Event Rate } 1122) \quad \text{(EQN. 7)}$$

If the result of decision block 1212 is yes, method 1200 proceeds to a block 1214 where processing subsystem 1102 executes malfunction identification instructions 1110 to determine that sensor 122(1) is malfunctioning. Method 1200 subsequently proceeds to a block 1216 where processing subsystem 1102 executes signaling instructions 1112 to transmit a malfunction identification signal 126 (FIG. 1) to external system 110, where malfunction identification signal 126 indicates that sensor 122(1) is malfunctioning.

It should be noted that inclusion of decision block 1212 in method 1200 helps prevent sensor 122(1) for being identified as malfunctioning when there is a large-scale event, such as a weather event, which causes sensors 122 to experience a higher than normal event rate. Additionally, in some alternate embodiments of method 1200, event rate 1116 of sensor 122(1), as well as collective event rate 1120, are determined using an exponentially weighted lookback period, such as to achieve recency bias in event rate values.

Changes may be made in the above methods, devices, and systems without departing from the scope hereof. For example, environment 100 (FIG. 1) may be modified to include only one of classification system 102 and malfunction identification system 104, instead of both of classification system 102 and malfunction identification system 104.

It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

Combinations of Features

Features described above may be combined in various ways without departing from the scope hereof. The following examples illustrate some possible combinations.

(A1) A method for classifying an alternating current (AC) electric power source powering a first node of a communication network after an apparent conclusion of a power outage, the method including (1) receiving, at a classification system, measurement data from a sensor that is transmitted to the classification system via the communication network, the measurement data representing one or more characteristics of AC electric power provided to the first node, (2) comparing, at the classification system, (i) an electrical characteristic of AC electric power provided to the first node at a time $t_1$, the time $t_1$ being after the apparent conclusion of the power outage, to (ii) a range of an electrical characteristic of AC electric power provided to the first node during a time period $T_h$, the time period $T_h$ being a historical time period before the power outage, and (3) performing, at the classification system, a first classification indicating that a generator, and not an AC electric power grid, is powering the first node at the time $t_1$, in response to the electrical characteristic of the AC electric power provided to the first node at the time $t_1$ being outside of the range of the electrical characteristic of the AC electric power provided to the first node during the time period $T_h$.

(A2) The method denoted as (A1) may further include sending a first classification signal from the classification system to an external system, the first classification signal indicating that the first node is being powered by the generator at the time $t_1$.

(A3) In either one of the methods denoted as (A1) or (A2), (1) the electrical characteristic of the AC electric power provided to the first node during the time period $T_h$ may include root mean square (RMS) magnitude of voltage of the AC electric power provided to the first node during the time period $T_h$,, and (2) the electrical characteristic of the AC electric power provided to the first node at the time $t_1$ may include RMS magnitude of voltage of the AC electric power provided to the first node at the time $t_1$.

(A4) In either one of the methods denoted as (A1) or (A2), (1) the electrical characteristic of the AC electric power provided to the first node during the time period $T_h$ may include one or more of peak-to-peak magnitude, frequency, noise content, and harmonic content, of voltage of the AC electric power provided to the first node during the time period $T_h$, and (2) the electrical characteristic of the AC electric power provided to the first node at the time $t_1$ may include one or more of peak-to-peak magnitude, frequency, noise content, and harmonic content, of voltage of the AC electric power provided to the first node at the time $t_1$.

(A5) Any one of the methods denoted as (A1) through (A4) may further include, at the classification system, (1) performing short-term statistical analysis of the measurement data to determine one or more short-term statistical difference values between (i) electrical characteristics of AC electric power provided to the first node over a first time duration, the first time duration being before the power outage, and (ii) electrical characteristics of AC electric power provided to the first node over a second time duration, the second time duration being after the apparent conclusion of the power outage, and (2) performing a second classification indicating that the generator, and not the AC electric power grid, is powering the first node during the second time duration, in response to the one or more short-term statistical difference values meeting one or more second threshold conditions.

(A6) The method denoted as (A5) may further include sending a second classification signal from the classification system to an external system, the second classification signal indicating that the first node is being powered by the generator during the second time duration.

(A7) In either one of the methods denoted as (A5) or (A6), performing short-term statistical analysis of the measurement data may include one or more of (i) performing efficiency statistical analysis of the measurement data, (ii) performing change point statistical analysis of the measurement data, and (iii) performing distribution statistical analysis of the measurement data.

(A8) Any of the methods denoted as (A5) through (A8) may further include, at the classification system, (1) performing long-term statistical analysis of the measurement data to determine one or more long-term statistical difference values between (i) electrical characteristics of AC electric power provided to the first node over a third time duration, the third time duration being before the power outage, and (ii) electrical characteristics of AC electric power provided to the first node over a fourth time duration, the fourth time duration being after the apparent conclusion of the power outage, and (2) performing a third classification indicating that the AC electric power grid is powering the first node during the fourth time duration with an operating point reset, in response to the one or more long-term statistical difference values meeting one or more third threshold conditions.

(A9) The method denoted as (A8) may further include sending a third classification signal from the classification system to an external system, the third classification signal indicating that the first node is being powered by the AC electric power grid with an operating point reset during the fourth time duration.

(A10) In either one of the methods denoted as (A8) and (A9), performing long-term statistical analysis of the measurement data may include one or more of (i) performing efficiency statistical analysis of the measurement data, (ii) performing change point statistical analysis of the measurement data, and (iii) performing distribution statistical analysis of the measurement data.

(A11) In any one of the methods denoted as (A8) through (A10), the apparent conclusion of the power outage may be characterized by an AC voltage on a power bus of the first node returning to being within an acceptable range after being outside of the acceptable range.

(A12) In any one of the methods denoted as (A8) through (A10), the third time duration may be the same as the first time duration.

(A13) In any one of the methods denoted as (A8) through (A10), the third time duration may be different from the first time duration.

(B1) A method for classifying an alternating current (AC) electric power source powering a first node of a communication network after an apparent conclusion of a power outage, the method including (1) receiving, at a classification system, measurement data from a sensor that is transmitted to the classification system via the communication network, the measurement data representing one or more characteristics of electric power provided to the first node, and (2) comparing, at the classification system, (i) a portion of the measurement data generated by the sensor before the power outage and (ii) a portion of the measurement data generated by the sensor after the apparent conclusion of the power outage, to determine whether the first node is being powered by a generator or by the AC electric power grid, after the apparent conclusion of the power outage.

(C1) The method for identifying a malfunctioning sensor, the method including (1) receiving, at a malfunction identification system via a communication network communicatively coupling a first sensor to the malfunction identification system, first measurement data from a first sensor, the first measurement data representing one or more characteristics of an electric power grid at a location of the first sensor, (2) determining, at the malfunction identification system, an event rate of the first sensor based at least partially on the first measurement data, and (3) identifying, at the malfunction identification system, the first sensor as a malfunctioning sensor at least partially in response to (i) the event rate of the first sensor meeting a first threshold condition and (ii) a collective event rate of one or more additional sensors meeting a second threshold condition.

(C2) In the method denoted as (C1), the event rate of the first sensor may be a power outage rate of the electric power grid at a location of the first sensor.

(C3) In the method denoted as (C2), the power outage rate of the electric power grid at the location of the first sensor may be a System Average Interruption Duration Index (SAIDI) determined from the first measurement data.

(C4) In any one of the methods denoted as (C1) through (C3), the collective event rate of the one or more additional sensors may be a collective power outage rate of the electric power grid at respective locations of the one or more additional sensors.

(C5) In the method denoted as (C4), the collective power outage rate of the electric power grid at the respective locations of the one or more additional sensors may be a System Average Interruption Duration Index (SAIDI) determined from respective measurement data from the one or more additional sensors.

(C6) In any one of the methods denoted as (C1) through (C5), each of the one or more additional sensors may be located within a predetermined proximity to the first sensor.

Example Instructions

By way of example and not limitation, the following is one example of instructions that may be executed by one or more processors to perform functions of one example embodiment of malfunction identification system 104 of FIG. 1:

```
def generate_probation_list (df: pd.DataFrame, run_time: float,
                        min_outages: int,
                      neighbor_dict: typing.Dict[str, set],
                        usng_sensor_dict: typing.Dict[str,
                          typing.List[int]],
                        sensor_usng_dict: typing.Dict[int,
str])
-> typing.List[int]:
  # this is the threshold of outage time needed to trigger a
probation
  # check
    # it is based on all the sensors (287k) from [2020-04-01,
2021-04-21]
    # this should be updated periodically, maybe every quarter
or at most per
  # month
```

-continued

```
    outage_frac_975 = 0.013   # exact = 0.0129035218253968
    # minimum number of sensors in neighboring 3x3 grid to be
used in
  # neighbor calculation
    min_neighbors = 4    # arbitrary
    # this is in case there are some ongoing events so we
replace nan with
    # the end of the day time
    eod = max(df.end_time)
    eod = eod.replace (hour=23, minute=59, second=59)
    print(f"EOD is: {eod}.\nRun time is: {run_time}")
    # some events may still be pending
    # if so, make the end of the event be the end_time
    # this could result in a sensor being below threshold in the
case that a
    # short outage spills over a day boundary
    df = df.assign(end_time=df.end_time.fillna(eod))
    # the routine outputs via print the following information
for each
    # probation candidate
    # sensor, usng, num_outages, minutes_out,
outage_frac_sensor,
    # num_nbr_outages, outage_frac_nbr
    probation_sensors = [ ]
    df = df.assign(duration=(df.end_time −
df.star_time).dt.total_seconds( ))
    outage_totals =
df.groupby('canonical_sensor_id').duration.sum( ).to_frame
('total_time_out')
    outage_totals = outage_totals.reset_index( )
    outage_duration_dict = {x: y for x, y in
zip(outage_totals.canonical_sensor_id.values,
outage_totals.total_time_out.values)}
    outage_counts =
df.groupby('canonical_sensor_id').event.count( ).to_frame
('outage_count')
    outage_counts = outage_counts.reset_index( )
    outage_count_dict = {x: y for x, y in
zip(outage_counts.canonical_sensor_id.values,
outage_counts.outage_count.values)}
    outage_totals =
outage_totals.assign(outage_frac=outage_totals.total_time_out /
run_time)
    # Only consider a list of candidate sensors
    probation_candidates =
outage_totals.loc[outage_totals.outage_frac >= outage_frac_975]
    sensors =
probation_candidates.canonical_sensor_id.unique( ).tolist( )
    sensors = [int (_) for _ in sensors]
    print(f"There are {len(sensors)} probation candidates")
    print ("Starting sensor for loop")
    for sensor in sensors:    # get the sensor
      # collect power outage events only
      sum_deltas = 0
      if sensor in outage_duration_dict:
        sum_deltas = outage_duration_dict[sensor]
      num_outages = 0
      if sensor in outage_count_dict:
        num_outages = outage_count_dict[sensor]
      # now get the 3x3 USNG neighbors
      usng = sensor_usng_dict[sensor]
      if usng in neighbor_dict:
        nearest = list(neighbor_dict[usng])
      else:
        nearest = [ ]
      all_sensors = [ ]
      near_sensors = flatten([usng_sensor_dict[x] for x in
nearest
                        if x in usng_sensor_dict])
    near_sensors = [int(_) for _ in near_sensors if _ !=
sensor]
    all_sensors.extend(near_sensors)
    all_sensors = list(set(flatten(all_sensors)))
    num_nbr_sensors = len(all_sensors)
    if num_nbr_sensors < min_neighbors:
# insufficient neighbors so use the probation criteria directly
      if num_outages >= min_outages:
        probation_sensors.append(sensor)
      elif (sum_deltas / run_time) >= 0.10:
```

-continued

```
        probation_sensors.append(sensor)
      continue
    nbr_sum_deltas = 0
    num_nbr_outages = 0
    for nbr_sensor in all_sensors:   # find all the neighbors
      if nbr_sensor in outage_duration_dict:
        nbr_sum_deltas +=
outage_duration_dict[nbr_sensor]
      if nbr_sensor in outage_count_dict:
        num_nbr_outages += outage_count_dict[nbr_sensor]
    outage_frac_nbr = nbr_sum_deltas / num_nbr_sensors /
run_time
    # finally, this is the actual test to flag probation
candidates with neighbors
    # Add or condition. If sensor outage_frac is high enough
then min_outages shouldn't matter
    if ((outage_frac_975 > outage_frac_nbr and num_outages
>= min_outages) or
          (outage_frac_975 > outage_frac_nbr and
sum_deltas >= 0.75)):   # avoid widespread outages
      probation_sensors.append (sensor)
  print ("Done with sensor loop")
  return probation_sensors
```

What is claimed is:

1. A method for classifying an alternating current (AC) electric power source powering a first node of a communication network after an apparent conclusion of a power outage, the method comprising:

receiving, at a classification system, measurement data from a sensor that is transmitted to the classification system via one or more paths of the communication network, the one or more paths of the communication network being separate from an AC electric power grid that serves the first node such that the measurement data is transmitted to the classification system out of band with respect to the AC electric power grid that serves the first node, the measurement data from the sensor representing one or more characteristics of AC electric power provided to the first node, identifying occurrence of the power outage from magnitude of voltage of AC electric power provided to the first node having dropped below an acceptable range;

after magnitude of voltage of AC electric power provided to the first node has risen to the acceptable range to indicate the apparent conclusion of the power outage, determining, at the classification system, a difference value representing a difference between (i) measurement data from the sensor representing an electrical characteristic of AC electric power provided to the first node at a time $t_1$, the time $t_1$ being after the apparent conclusion of the power outage, and (ii) measurement data from the sensor representing a range of an electrical characteristic of AC electric power provided to the first node during a time period $T_h$, the time period $T_h$ being a historical time period before the power outage; and performing, at the classification system, a first classification indicating that a generator, and not the AC electric power grid that serves the first node, is powering the first node at the time $t_1$, in response to the difference value meeting one or more threshold conditions.

2. The method of claim 1, further comprising sending a first classification signal from the classification system to an external system, the first classification signal indicating that the first node is being powered by the generator at the time $t_1$.

3. The method of claim 1, wherein:

the electrical characteristic of the AC electric power provided to the first node during the time period $T_h$ comprises root mean square (RMS) magnitude of voltage of the AC electric power provided to the first node during the time period $T_h$; and the electrical characteristic of the AC electric power provided to the first node at the time $t_1$ comprises RMS magnitude of voltage of the AC electric power provided to the first node at the time $t_1$.

4. The method of claim 1, wherein:

the electrical characteristic of the AC electric power provided to the first node during the time period $T_h$ comprises one or more of peak-to-peak magnitude, frequency, noise content, and harmonic content, of voltage of the AC electric power provided to the first node during the time period $T_h$; and the electrical characteristic of the AC electric power provided to the first node at the time $t_1$ comprises one or more of peak-to-peak magnitude, frequency, noise content, and harmonic content, of voltage of the AC electric power provided to the first node at the time $t_1$.

5. The method of claim 1, further comprising, at the classification system:

performing short-term statistical analysis of the measurement data from the sensor to determine one or more short-term statistical difference values between (i) electrical characteristics of AC electric power provided to the first node over a first time duration, the first time duration being before the power outage, and (ii) electrical characteristics of AC electric power provided to the first node over a second time duration, the second time duration being after the apparent conclusion of the power outage; and performing a second classification indicating that the generator, and not the AC electric power grid that serves the first node, is powering the first node during the second time duration, in response to the one or more short-term statistical difference values meeting one or more second threshold conditions.

6. The method of claim 5, further comprising sending a second classification signal from the classification system to an external system, the second classification signal indicating that the first node is being powered by the generator during the second time duration.

7. The method of claim 5, wherein performing short-term statistical analysis of the measurement data comprises one or more of (i) performing efficiency statistical analysis of the measurement data, (ii) performing change point statistical analysis of the measurement data, and (iii) performing distribution statistical analysis of the measurement data.

8. A method for classifying an alternating current (AC) electric power source powering a first node of a communication network after an apparent conclusion of a power outage, the method comprising:

receiving, at a classification system, measurement data from a sensor that is transmitted to the classification system via one or more paths of the communication network, the one or more paths of the communication network being separate from an AC electric power grid that serves the first node such that the measurement data is transmitted to the classification system out of band with respect to the AC electric power grid that serves the first node, the measurement data representing one or more characteristics of AC electric power provided to the first node;

comparing, at the classification system, (i) an electrical characteristic of AC electric power provided to the first node at a time $t_1$, the time $t_1$ being after the apparent conclusion of the power outage, to (ii) a range of an electrical characteristic of AC electric power provided to the first node during a time period $T_h$, the time period $T_h$ being a historical time period before the power outage;

performing, at the classification system, a first classification indicating that a generator, and not the AC electric power grid that serves the first node, is powering the first node at the time $t_1$, in response to the electrical characteristic of the AC electric power provided to the first node at the time $t_1$ being outside of the range of the electrical characteristic of the AC electric power provided to the first node during the time period $T_h$;

performing, at the classification system, short-term statistical analysis of the measurement data to determine one or more short-term statistical difference values between (i) electrical characteristics of AC electric power provided to the first node over a first time duration, the first time duration being before the power outage, and (ii) electrical characteristics of AC electric power provided to the first node over a second time duration, the second time duration being after the apparent conclusion of the power outage;

performing at the classification system, a second classification indicating that the generator, and not the AC electric power grid that serves the first node, is powering the first node during the second time duration, in response to the one or more short-term statistical difference values meeting one or more second threshold conditions;

performing, at the classification system, long-term statistical analysis of the measurement data to determine one or more long-term statistical difference values between (i) electrical characteristics of AC electric power provided to the first node over a third time duration, the third time duration being before the power outage, and (ii) electrical characteristics of AC electric power provided to the first node over a fourth time duration, the fourth time duration being after the apparent conclusion of the power outage; and performing, at the classification system, a third classification indicating that the AC electric power grid that serves the first node is powering the first node during the fourth time duration with an operating point reset, in response to the one or more long-term statistical difference values meeting one or more third threshold conditions.

9. The method of claim 8, further comprising sending a third classification signal from the classification system to an external system, the third classification signal indicating that the first node is being powered by the AC electric power grid that serves the first node with an operating point reset during the fourth time duration.

10. The method of claim 8, wherein performing long-term statistical analysis of the measurement data comprises one or more of (i) performing efficiency statistical analysis of the measurement data, (ii) performing change point statistical analysis of the measurement data, and (iii) performing distribution statistical analysis of the measurement data.

11. The method of claim 8, wherein the apparent conclusion of the power outage is characterized by an AC voltage on a power bus of the first node returning to being within an acceptable range after being outside of the acceptable range.

12. The method of claim 8, wherein the third time duration is the same as the first time duration.

13. The method of claim 8, wherein the third time duration is different from the first time duration.

14. A method for classifying an alternating current (AC) electric power source powering a first node of a communication network after an apparent conclusion of a power outage, the method comprising:

receiving, at a classification system, measurement data from a sensor that is transmitted to the classification system via one or more paths of the communication network, the one or more paths of the communication network being separate from an AC electric power grid that serves the first node such that the measurement data is transmitted to the classification system out of band with respect to the AC electric power grid that serves the first node, the measurement data representing one or more characteristics of electric power provided to the first node;

identifying occurrence of the power outage from magnitude of voltage of electric power provided to the first node having dropped below an acceptable range;

after magnitude of voltage of electric power provided to the first node has risen to the acceptable range to indicate the apparent conclusion of the power outage determining, at the classification system, a difference value representing a difference between (i) a portion of the measurement data generated by the sensor before the power outage and (ii) a portion of the measurement data generated by the sensor after the apparent conclusion of the power outage; and determining, based on the difference value, whether the first node is being powered by a generator or by the AC electric power grid that serves the first node, after the apparent conclusion of the power outage.

* * * * *